United States Patent
Smith et al.

(10) Patent No.: US 9,280,613 B2
(45) Date of Patent: Mar. 8, 2016

(54) METADATA ENABLED THIRD-PARTY APPLICATION ACCESS OF CONTENT AT A CLOUD-BASED PLATFORM VIA A NATIVE CLIENT TO THE CLOUD-BASED PLATFORM

(71) Applicant: Box, Inc., Los Altos, CA (US)

(72) Inventors: Michael Smith, Palo Alto, CA (US); Benjamin Campbell Smith, Mountain View, CA (US); Simon Tan, Daly City, CA (US); Rico Yao, San Jose, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/898,200

(22) Filed: May 20, 2013

(65) Prior Publication Data
US 2013/0318125 A1 Nov. 28, 2013

Related U.S. Application Data

(63) Continuation of application No. 13/897,421, filed on May 19, 2013.

(60) Provisional application No. 61/653,876, filed on May 31, 2012, provisional application No. 61/650,840, filed on May 23, 2012.

(51) Int. Cl.
| | |
|---|---|
| H04L 29/06 | (2006.01) |
| G06F 17/30 | (2006.01) |
| H04N 7/16 | (2011.01) |
| G06F 7/04 | (2006.01) |
| G06F 15/16 | (2006.01) |
| G06F 15/173 | (2006.01) |

(52) U.S. Cl.
CPC ........ *G06F 17/30997* (2013.01); *G06F 17/301* (2013.01); *H04L 63/0428* (2013.01); *H04L 63/08* (2013.01)

(58) Field of Classification Search
None
See application file for complete search history.

(56) References Cited

U.S. PATENT DOCUMENTS

| 858,619 A | 7/1907 | O'Farrell |
| 5,748,735 A | 5/1998 | Ganesan |
| 5,787,175 A | 7/1998 | Carter |
| 5,799,320 A | 8/1998 | Klug |

(Continued)

FOREIGN PATENT DOCUMENTS

| CA | 2724521 | 11/2009 |
| CN | 101997924 A | 3/2011 |

(Continued)

OTHER PUBLICATIONS

International Search Report and Written Opinion for PCT/US2013/029520, Applicant: Box, Inc., Mailed Jun. 26, 2013, 10 pages.

(Continued)

*Primary Examiner* — Shin-Hon Chen
(74) *Attorney, Agent, or Firm* — Perkins Coie LLP

(57) ABSTRACT

Techniques are disclosed for methods, architectures and security mechanisms for a third-party application to access content in a cloud-based platform. In one embodiment, a method includes, receiving, at the third-party application, metadata that identifies the file. The method further includes transmitting the metadata to a server which is associated with the third-party application. The metadata enables the server to request the file from the cloud-based environment.

31 Claims, 18 Drawing Sheets

(56) References Cited

U.S. PATENT DOCUMENTS

| | | |
|---|---|---|
| 5,848,415 A | 12/1998 | Guck |
| 5,864,870 A | 1/1999 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,178,021 B1 | 2/2007 | Hanna et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2* | 6/2011 | Matsuzaki et al. ............ 713/170 |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,214,747 B1 | 7/2012 | Yankovich et al. |
| 8,224,934 B1 | 7/2012 | Dongre et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B2 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,527,549 B2 | 9/2013 | Cidon |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,620,578 B1 | 12/2013 | Brown et al. |
| 8,650,498 B1 | 2/2014 | Mihovilovic |
| 8,719,445 B2 | 5/2014 | Ko |
| 8,745,267 B2 | 6/2014 | Luecke et al. |
| 8,825,597 B1 | 9/2014 | Houston et al. |
| 8,849,955 B2 | 9/2014 | Prahlad et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,939 B2 | 2/2015 | Peddada |
| 8,959,579 B2 | 2/2015 | Barton et al. |
| 8,966,062 B1 | 2/2015 | Giese et al. |
| 8,990,955 B2 | 3/2015 | Hymel et al. |
| 9,135,462 B2 | 9/2015 | Scharf et al. |
| 9,195,519 B2 | 11/2015 | Tan et al. |
| 2001/0027492 A1 | 10/2001 | Gupta |
| 2002/0029218 A1 | 3/2002 | Bentley et al. |
| 2002/0062218 A1 | 5/2002 | Pianin |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0021686 A1 | 2/2004 | Barberis |
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |

(56) References Cited

U.S. PATENT DOCUMENTS

| | | |
|---|---|---|
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0038997 A1 | 2/2005 | Kojima et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0239447 A1 | 10/2005 | Holzman et al. |
| 2005/0261933 A1 | 11/2005 | Magnuson |
| 2005/0283800 A1 | 12/2005 | Ellis et al. |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0095526 A1 | 5/2006 | Levergood et al. |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0011261 A1 | 1/2007 | Madams et al. |
| 2007/0016680 A1 | 1/2007 | Burd et al. |
| 2007/0038934 A1 | 2/2007 | Fellman |
| 2007/0050635 A1 | 3/2007 | Popp |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0192630 A1 | 8/2007 | Crane et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300527 A1 | 12/2009 | Malcolm et al. |
| 2009/0327358 A1 | 12/2009 | Lukiyanov et al. |
| 2009/0327405 A1 | 12/2009 | FitzGerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |

(56) References Cited

U.S. PATENT DOCUMENTS

| | | | |
|---|---|---|---|
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0306379 A1 | 12/2010 | Ferris |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van Der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0154231 A1 | 6/2011 | Cherdron et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1* | 7/2011 | Fang ............................ 719/329 |
| 2011/0185292 A1 | 7/2011 | Chawla et al. |
| 2011/0197156 A1 | 8/2011 | Strait et al. |
| 2011/0202424 A1 | 8/2011 | Chun et al. |
| 2011/0202599 A1 | 8/2011 | Yuan et al. |
| 2011/0207436 A1 | 8/2011 | van Gent et al. |
| 2011/0208958 A1* | 8/2011 | Stuedi et al. .................. 713/150 |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252071 A1 | 10/2011 | Cidon |
| 2011/0252320 A1 | 10/2011 | Arrasvuori et al. |
| 2011/0252339 A1 | 10/2011 | Lemonik et al. |
| 2011/0258461 A1* | 10/2011 | Bates ............................ 713/190 |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1* | 12/2011 | Ferris et al. .................. 709/226 |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0092055 A1 | 4/2012 | Peschke et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1* | 5/2012 | Liu ................................ 380/28 |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1* | 6/2012 | Lin et al. ...................... 713/178 |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1* | 7/2012 | Martinez et al. .................. 726/1 |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1* | 8/2012 | Beaty et al. ................... 709/226 |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |

(56) References Cited

U.S. PATENT DOCUMENTS

| | | |
|---|---|---|
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1* | 11/2012 | Quine .......................... 717/115 |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007074 A1 | 1/2013 | Weicher |
| 2013/0007245 A1 | 1/2013 | Malik et al. |
| 2013/0007471 A1* | 1/2013 | Grab et al. .................. 713/193 |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1* | 2/2013 | Persaud et al. ............... 713/165 |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0159411 A1 | 6/2013 | Bowen |
| 2013/0159707 A1 | 6/2013 | Jogand-Coulomb et al. |
| 2013/0163289 A1 | 6/2013 | Kim et al. |
| 2013/0167253 A1 | 6/2013 | Seleznev et al. |
| 2013/0185347 A1 | 7/2013 | Romano |
| 2013/0185558 A1* | 7/2013 | Seibert et al. ................ 713/168 |
| 2013/0191339 A1 | 7/2013 | Haden et al. |
| 2013/0198474 A1 | 8/2013 | Shaath |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246901 A1 | 9/2013 | Massand |
| 2013/0246932 A1* | 9/2013 | Zaveri et al. ................. 715/740 |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1* | 10/2013 | Besen et al. .................. 709/205 |
| 2013/0305039 A1* | 11/2013 | Gauda ........................... 713/153 |
| 2013/0326344 A1 | 12/2013 | Masselle et al. |
| 2013/0347070 A1 | 12/2013 | Cairns et al. |
| 2014/0007205 A1 | 1/2014 | Oikonomou |
| 2014/0013112 A1 | 1/2014 | Cidon et al. |
| 2014/0019497 A1 | 1/2014 | Cidon et al. |
| 2014/0019498 A1 | 1/2014 | Cidon et al. |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1* | 2/2014 | Tseng et al. .................. 711/154 |
| 2014/0059217 A1 | 2/2014 | Pizurica |
| 2014/0068589 A1 | 3/2014 | Barak |
| 2014/0074629 A1 | 3/2014 | Rathod |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0344456 A1 | 11/2014 | Buzbee et al. |
| 2014/0359286 A1 | 12/2014 | Wen et al. |
| 2015/0019723 A1 | 1/2015 | Kweon et al. |
| 2015/0200948 A1 | 7/2015 | Cairns et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

International Search Report and Written Opinion for PCT/US2013/023889, Applicant: Box, Inc., Mailed Jun. 24, 2013, 13 pages.

International Search Report and Written Opinion for PCT/US2013/035404, Applicant: Box, Inc., Mailed Jun. 26, 2013, 13 pages.

"Conceptboard", One-Step Solution for Online Collaboration, retrieved from websites http://conceptboard.com and https://www.youtube.com/user/ConceptboardApp?feature=watch, printed on Jun. 13, 2013, 9 pages.

"PaperPort Professional 14," PC Mag. Com review, published Feb. 2012, Ziff Davis, Inc., 8 pages.

"PaperPort," Wikipedia article (old revision), published May 19, 2012, Wikipedia Foundation, 2 pages.

"Quickoffice Enhances Android Mobile office Application for Improved Productivity on latest Smartphone and Table Devices," QuickOffice Press Release, Nov. 21, 2011, QuickOffice Inc., 2 pages.

"QuickOffice," Wikipedia Article (old revision), published May 9, 2012, Wikipedia Foundation, 2 pages.

Exam Report for EP13158415.3, Applicant: Box, Inc. Mailed Jun. 4, 2013, 8 pages.

Exam Report for EP13168784.0, Applicant: Box, Inc. Mailed Nov. 21, 2013, 7 pages.

Exam Report for EP13185269.1, Applicant: Box, Inc. Mailed Jan. 28, 7 pages.

Exam Report for GB1300188.8, Applicant: Box, Inc. Mailed May 31, 2013, 8 pages.

(56) References Cited

OTHER PUBLICATIONS

Exam Report for GB1306011.6, Applicant: Box, Inc. Mailed Apr. 18, 2013, 8 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/034662, Applicant: Box, Inc., Mailed May 31, 2013, 10 pages.
International Search Report and Written Opinion for PCT/US2013/034765, Applicant: Box, Inc., Mailed Jan. 20, 2014, 15 pages.
International Search Report and Written Opinion for PCT/US2013/039782, Applicant: Box, Inc., Mailed Aug. 28, 2013, 15 pages.
Patent Court Document of Approved Judgment for GB0602349.3 and GB0623571.7; Mar. 3, 2009, 17 pages.
"Average Conversion Time for a D60 Raw file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
John et al., "Always Sync Support Forums—View topic—Allway sync funny behavior," Allway Sync Support Forum at http://sync-center.com, Mar. 28, 2011, XP055109680, 2 pages.
Search Report for EP 11729851.3, Applicant: Box, Inc. Mailed Feb. 7, 2014, 9 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Search Report for EP13187217.8, Applicant: Box, Inc. Mailed Apr. 15, 2014, 12 pages.
Rao, "Box Acquires Crocodoc to Add HTML5 Document Converter and Sleek Content Viewing Experience to Cloud Storage Platform," retrieved from the internet, http://techcrunch.com, May 9, 2013, 8 pages.
Walker, "PDF.js project meeting notes," retrieved from the internet, http://groups.google.com, May 15, 2014, 1 page.
Sommerer, "Presentable Document Format: Improved On-demand PDF to HTML Conversion," retrieved from the internet, http://research.microsoft.com, 8 pages.
"Tulsa TechFest 2012—Agenda," retrieved from the website, http://web.archive.org, Oct. 2, 2012, 2 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Cohen, "Debating the Definition of Cloud Computing Platforms," retrieved from the internet, http::///forbes.com, Feb. 3, 2014, 7 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
International Search Report and Written Opinion for PCT/US2008/012973 dated Apr. 30, 2009, pp. 1-11.
International Search Report and Written Opinion for PCT/US2010/070366, Applicant: Box, Inc., Mailed Mar. 24, 2013, 10 pages.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2013/020267, Applicant: Box, Inc., Mailed May 7, 2013, 10 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.

(56) References Cited

OTHER PUBLICATIONS

"Conceptboard", One-Step Solution for Online Collaboration, from websites http://conceptboard.com and https://www.youtube.com/user/ConceptboardApp?feature=watch, printed on Jun. 13, 2013, 9 pages.
"Revolving sync conflicts; frequently asked questions," Microsoft Tech Support, Jul. 16, 2012, retrieved from the Internet: http://web.archive.org/web, 2 pages.
"Troubleshoot sync problems," Microsoft Tech Support: May 2, 2012, retrieved from the internet, http://web. Archive.org/web, 3 pages.
Duffy, "The Best File-Syncing Services," pcmag.com, retrieved from the internet: http://www.pcmag.com, Sep. 28, 2012, 7 pages.
Exam Report for EP13177108.1, Applicant: Box, Inc. Mailed May 26, 2014, 6 pages.
Exam Report for GB1318792.7, Applicant: Box, Inc. Mailed May 22, 2014, 2 pages.
Partial Search Report for EP131832800, Applicant: Box, Inc. Mailed May 8, 2014, 5 pages.
Pyle et al., "How to enable Event logging for Offline Files (Client Side Caching) in Windows Vista," Feb. 18, 2009, retrieved from the internet: http://blogs.technet.com, 3 pages.
Search Report for EP141509422, Applicant: Box, Inc. Mailed May 8, 2014, 7 pages.
Tulloch et al., "Windows Vista Resource Kit," Apr. 8, 2007, Microsoft Press, XP055113067, 6 pages.
Sommerer, "Presentable Document Format: Improved On-demand PDF to HTML Conversion," retrieved from the internet, http://research.microsoft.com, Nov. 2004, 8 pages.
Exam Report for GB1410569.6 Applicant: Box, Inc. Mailed Jul. 11, 2014, 9 pages.
Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
No Stated Author, Amazon Simple Storage Services FAQs, 2012, https://web.archive.org.web/20120615092600/http://aws.amazon.com/s3/faqs/>; pp. 1-14.
Mogull, "DLP Content Discovery: Best Practices for Stored Data Discovery and Protection," 2009, pp. 1-16.
No Stated Author, "CheckPoint Virtual Appliance for Amazon Web Services," 2012, pp. 1-6.
Exam Report for GB1309209.3; Applicant: Box, Inc. Mailed Jul. 15, 2015, 8 pages.
Exam Report for GB1316532.9 Applicant: Box, Inc. Mailed Mar. 27, 2015, 6 pages.
Burney, "How to Move Document from Your Computer to Your iPad and Back Again," May 31, 2011, 3 pages.
"Dropbox: Sync only specific folders," posted on Feb. 9, 2012, available online at http://www.tech-recipes.com/rx/20865/dropbox-sync-only-specific-folders/, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
Wei, et al., "Managing Security of Virtual Machine Images in a Cloud Environment," CCSW'09, Nov. 13, 2009, pp. 91-96.

\* cited by examiner

US 9,280,613 B2

METADATA ENABLED THIRD-PARTY APPLICATION ACCESS OF CONTENT AT A CLOUD-BASED PLATFORM VIA A NATIVE CLIENT TO THE CLOUD-BASED PLATFORM

CROSS-REFERENCE TO RELATED APPLICATIONS AND EFFECTIVE FILING DATE ENTITLEMENT

The application is a continuation application of U.S. patent application Ser. No. 13/897,421, entitled "METHODS, ARCHITECTURES AND SECURITY MECHANISMS FOR A THIRD-PARTY APPLICATION TO ACCESS CONTENT IN A CLOUD-BASED PLATFORM", filed May 19, 2013, which claims priority to U.S. Provisional Application No. 61/650,840, entitled "PLATFORM AND APPLICATION AGNOSTIC METHOD FOR SEAMLESS FILE ACCESS IN A MOBILE ENVIRONMENT", filed May 23, 2012; and U.S. Provisional Application No. 61/653,876, entitled "PLATFORM AND APPLICATION AGNOSTIC METHOD FOR SEAMLESS FILE ACCESS IN A MOBILE ENVIRONMENT", filed May 31, 2012, all of which are hereby incorporated by reference in their entireties. This application is therefore entitled to an effective filing date of May 23, 2012.

This application is related to U.S. patent application Ser. No. 13/886,147, entitled "SYSTEM AND METHOD FOR A THIRD-PARTY APPLICATION TO ACCESS CONTENT WITHIN A CLOUD-BASED PLATFORM", filed May 2, 2013, which is entitled to the benefit of and/or the right of priority to U.S. Provisional Application No. 61/641,824, entitled "PLATFORM AND APPLICATION AGNOSTIC METHOD FOR SEAMLESS FILE ACCESS IN A MOBILE ENVIRONMENT", filed May 2, 2012, all of which are hereby incorporated by reference in their entireties.

COPYRIGHT NOTICE

A portion of the disclosure of this patent document contains material that is subject to copyright protection. The copyright owner has no objection to the facsimile reproduction by anyone of the patent document or the patent disclosure, as it appears in the United States Patent and Trademark Office patent files or records, but otherwise reserves all copyright rights whatsoever. The following notice applies to the software and data as described below and in the drawings that form a part of this document: Copyright 2013, Box, Inc., All Rights Reserved.

BACKGROUND

With the advancements in digital technologies, data proliferation and the ever increasing mobility of user platforms which enable and encourage development of third-party applications have become ubiquitous in sectors of modern society, and as a result, data becomes shared across multiple sources as is use of third-party applications. This has become relevant with the increase of electronic and digital content being used in enterprise or social settings or shared environments of digital content compared to standalone personal computers and mobile devices.

However, to date, content sharing across multiple platforms using various application lacks the capabilities that provide the third-party applications with access to content or files stored in a workspace that is shared among multiple users in an intuitive and integrated manner.

BRIEF DESCRIPTION OF DRAWINGS

The present embodiments are illustrated by way of example and are not intended to be limited by the figures of the accompanying drawings. In the drawings.

The same reference numbers and any acronyms identify elements or acts with the same or similar structure or functionality throughout the drawings and specification for ease of understanding and convenience.

DETAILED DESCRIPTION

Figure 1:
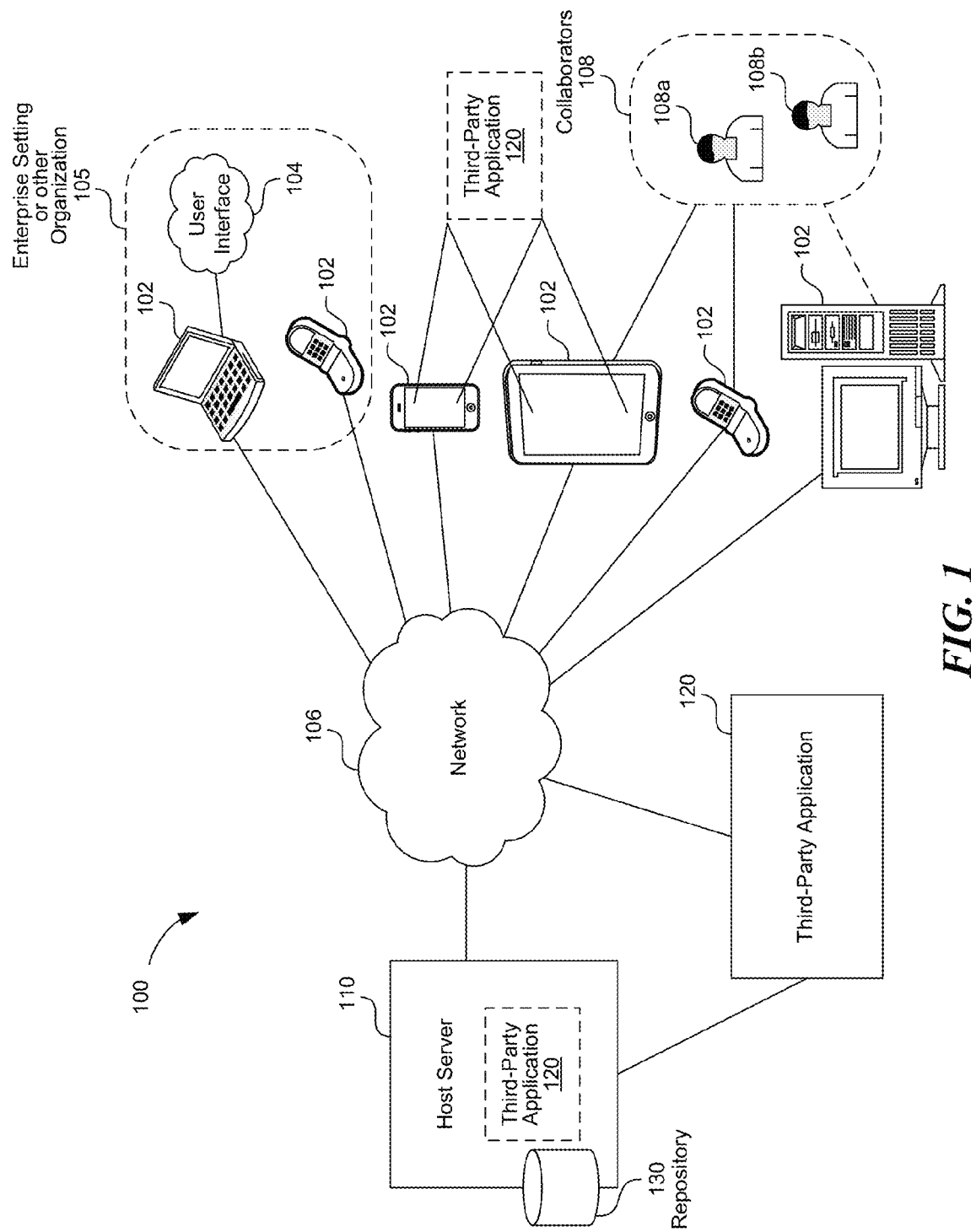
FIG. 1 depicts an example diagram of a system having a host server of a cloud service, collaboration and/or cloud storage accounts with capabilities that enable a third-party application to access content within a cloud-based platform in an integrated manner.

Techniques are disclosed for a third-party application to access content stored within a cloud-based platform or environment. In one embodiment, a method comprises, responsive to a request to access or edit a file received in the cloud-based environment, grant access or edit of the file using the third-party application. The third-party application includes a user interface which is customized to enable storage of the accessed or edited file to the cloud-based environment. In some embodiments, the third-party application is restricted to store the accessed file back to the cloud-based environment. Among other advantages, embodiments disclosed herein provide both accessibility of content within a cloud-based workspace to third-party applications and controllability over the manner of the third-party applications' accesses, thereby allowing the users to enjoy the benefit of freedom in choosing their own preferred programs from a wide-variety of third-party applications while maintaining or enhancing the security of the content stored within the cloud-based workspace.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms can be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms can be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

FIG. 1 illustrates an example diagram of a system 100 having a host server 110 of a cloud-based service/platform, collaboration workspace and/or cloud storage service with capabilities that enable that enable a third-party application to access content within a cloud-based platform in an integrated manner.

The client devices 102 can be any system and/or device, and/or any combination of devices/systems that is able to establish a communication or a connection, including wired, wireless, cellular connections with another device, a server and/or other systems such as host server 110 and/or a third-party application 120. Client devices 102 typically include a display and/or other output functionalities to present information and data exchanged between among the devices 102, the third-party application 120, and/or the host server 110.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a PDA, a smart phone (e.g., a BlackBerry device such as BlackBerry Z10/Q10, an iPhone, Nexus 4, etc.), a Treo, a handheld tablet (e.g. an iPad, iPad Mini, a Galaxy Note, Galaxy Note II, Xoom Tablet, Microsoft Surface, Blackberry PlayBook, Nexus 7, 10 etc.), a phablet (e.g., HTC Droid DNA, etc.), a tablet PC, a thin-client, a hand held console, a hand held gaming device or console (e.g., XBOX live, Nintendo DS, Sony PlayStation Portable, etc.), mobile-enabled powered watch (e.g., iOS, Android or other platform based), Google Glass, a Chromebook and/or any other portable, mobile, hand held devices, etc. running on any platform or any operating system (e.g., Mac-based OS (OS X, iOS, etc.), Windows-based OS (Windows Mobile, Windows 7, Windows 8, etc.), Android, Blackberry OS, Embedded Linux platforms, Palm OS, Symbian platform, Google Chrome OS, and the like. In one embodiment, the client devices 102, host server 110, and/or the third-party application 120 (e.g., a server hosting application 120) are coupled via a network 106. In some embodiments, the devices 102 and host server 100 and/or third-party application 120 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used by various users or collaborators (e.g., collaborators 108) for accessing, through network 106, a web-based collaboration environment or online collaboration platform (e.g., hosted by the host server 110). The collaboration environment or platform can have one or more collective settings 105 for an enterprise or an organization that the users belong, and can provide an user interface 104 for the users to access such platform under the settings 105.

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a workspace for other users to access (e.g., for viewing, editing, commenting, signing-off, or otherwise manipulating). The user can login to the online platform and upload the document (or any other type of work item) to an existing workspace or to a new workspace. The document can be shared with existing users or collaborators in a workspace.

In general, network 106, over which the client devices 102 and the host server 110 communicate may be a cellular network, a telephonic network, an open network, such as the Internet, or a private network, such as an intranet and/or the extranet, or any combination or variation thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 110 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), or any broadband network, and further enabled with technologies such as, by way of example, Global System for Mobile Communications (GSM), Personal Communications Service (PCS), Bluetooth, WiFi, Fixed Wireless Data, 2G, 2.5G, 3G (e.g., WCDMA/UMTS based 3G networks), 4G, IMT-Advanced, pre-4G, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, HSPA+, UMTS-TDD, 1×RTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks, broadband networks, or messaging protocols.

Third-party applications 120 can be located from one or more third-party service application providing servers, and/or they can be provided by third-party software application vendors to run on the host server 110, either of which may be accessed over the network 106 (e.g., in forms of web-based applications). Third-party applications 120 can also be provided to the user directly and can be accessed at/from/via, installed, executed and run on the user devices 102. These three different configurations (or suitable combinations of which) are illustrated in FIG. 1 by way of example. In any of these configurations, the third-party applications 120 can communicate with the host server 110 for accessing cloud-based collaboration platform, storage and/or services in performing their functions.

The embodiments disclosed herein recognize that, with the growing prevalence of the communication networks (e.g., the Internet) and smart portable devices (e.g., smart phones), there are many third-party applications 120 that need access to a cloud-based collaboration service/platform, and/or cloud-based file and content storage services in order to best facilitate an intuitive and straightforward user experience, For example, a user using a smart phone or a tablet computer may wish to run a third-party software application 120 (e.g., Google QuickOffice), to create or open a document, save the document back to a cloud-based collaboration and/or storage (e.g., cloud-based collaboration and/or storage services provided by Box, Inc., repository 130) and share it with a selected group of collaborators or in an enterprise including colleagues. One colleague as a reviewer may use another third-party software application 120 (e.g., Nuance Paperport) to annotate it, and another colleague may use yet another third-party software application 120 (e.g., Adobe Echosign) to sign the document, all accessing the same document on the cloud-based collaboration, interaction and/or storage services. For another example, a user of a third-party service application 120 (e.g., LinkedIn, Facebook or other application) may want to store his or her resume and/or other content on a user profile page provided by the third-party service application 120, which in turn would desirably store these files on a cloud-based environment/platform/services (e.g., collaboration and/or storage services) of the user.

However, whether it is for collaboration or for personal use or for both, existing techniques lack a user friendly, integrated way for the third-party applications and the users to enjoy a streamlined cloud-based environment/platform/services (e.g., collaboration, editing, sharing, and/or storage) experience without multiple uploading, downloading steps across multiple applications or devices which may further interrupt the user's work flow or potentially further risk a breach of security and/or privacy.

For example, some approaches lack the capability to provide the flexibility of using third-party applications to access content stored in the cloud-based workspace and the security assurances necessary toward such access, for example, in an enterprise setting where sensitive and/or confidential documents are often involved.

One way to provide access to content stored in a cloud-based collaborative environment is to allow the user and/or collaborators to download a copy of the content of interest (e.g., a file) so as to create a local copy of the file (e.g., on one of the user devices 102). Then, the user can use a suitable third-party application (e.g., which may be installed on the user device 102 as an application, or may be provided as a web browser plug-in that can access the application via the browser) of his or her own preference to access, view, edit, or otherwise modify the file.

However, this approach relinquishes access control over the file by simply allowing the file to be downloaded and copied without technical restrictions; it puts heavy reliance on the user and/or the third-party application to store back the file to the cloud-based platform, to control the access to the local copy of the file, and to delete any copies created for/during the access.

To overcome the above-mentioned drawbacks, one way is to provide access to a cloud-based collaborative environment is for a provider (e.g., who hosts the host server 110) of the cloud-based environment to also provide integrated editing tools, typically in forms of web-based applications (e.g., accessible via a web browser). However, this approach provides security and access controllability at the expense of flexibility; indeed, the users are forced to accept and use whichever applications or tools developed and/or deployed by the cloud service provider. Oftentimes, functionalities of these tools are simple and can be limited as compared to other third-party applications that are professionally developed.

Accordingly, embodiments of the present disclosure provide systems and methods that provide techniques for a third-party application to access content stored within a cloud-based platform or environment in an integrated, secure manner. In accordance with some embodiments, a system (e.g., host server 110, or user devices 102) implementing the techniques disclosed herein is provided that enables (e.g., through a software framework, an application programming interface, a software library, and/or an agent application) the third-party application 120 to connect to the host server 110 which hosts the cloud-based platform for accessing content that is stored in the cloud (e.g., in cloud repository 130).

In some embodiments, when a user desires to access content (e.g., a file) stored in the cloud-based platform using the third-party application 120, the user can first select to access the file in the cloud-based platform. For example, the user can utilize a user interface 104 (e.g., in forms of a mobile application installed on user devices 102, or in forms of webpages accessible by a browser) of the cloud-based environment to select the file of his or her interest. For purposes of discussion, assume the user interface 104 is provided through a mobile application. Then, when the user selects the file in the user interface 104 for accessing (e.g., for viewing, editing, signing, etc.), the mobile application can prompt the user to choose which third-party application 120 that he or she desires to use. Thereafter, the user devices 102 launches the third-party application 120, which can communicate with the mobile application so that the third-party application 120 can access the file through the mobile application. Some embodiments provide that the third-party application 120 is launched on the user devices 102 using a controlled launching interface that is different from an application launching interface provided by an operating system of the user devices 102.

More specifically, according to some implementations, the mobile application can handling authentication, navigation and upload/download of the file(s) of the user's interest. From one practical standpoint, the mobile application reduces the necessary effort for a developer of the third-party application 120 to build out the functionality and user interface for accessing the cloud-based platform/environment/workspace. From another practical standpoint, the controlled launching interface also provides a convenient means for the developers of the third-party applications 120 to advertise their software.

The users viewing files in the cloud-based environment (e.g., via user interface 104 as provided by the mobile application) can browse, install, choose, select, and/or operate third-party applications 120 (e.g., via the controlled launching interface) that incorporate the software library or framework that implements the disclosed techniques. The controlled launching interface can further filter the selection based on the type of file the user is trying to access. Among others, by providing a consistent user interface and level of security across the third-party applications 120 accessing the cloud-based platform, the software library or framework which implements the techniques disclosed herein provides flexibility to the user in choosing own preferred third-party applications 120, improves user experience, and reduces administrative burdens of those information technology (IT) personnel.

It is noted that the aforementioned embodiments with respect to the mobile application and/or the software library/framework are merely some aspects of the present disclosed techniques. More implementation details regarding the host server 110 and the third-party application 120 are discussed below.

Figure 2:
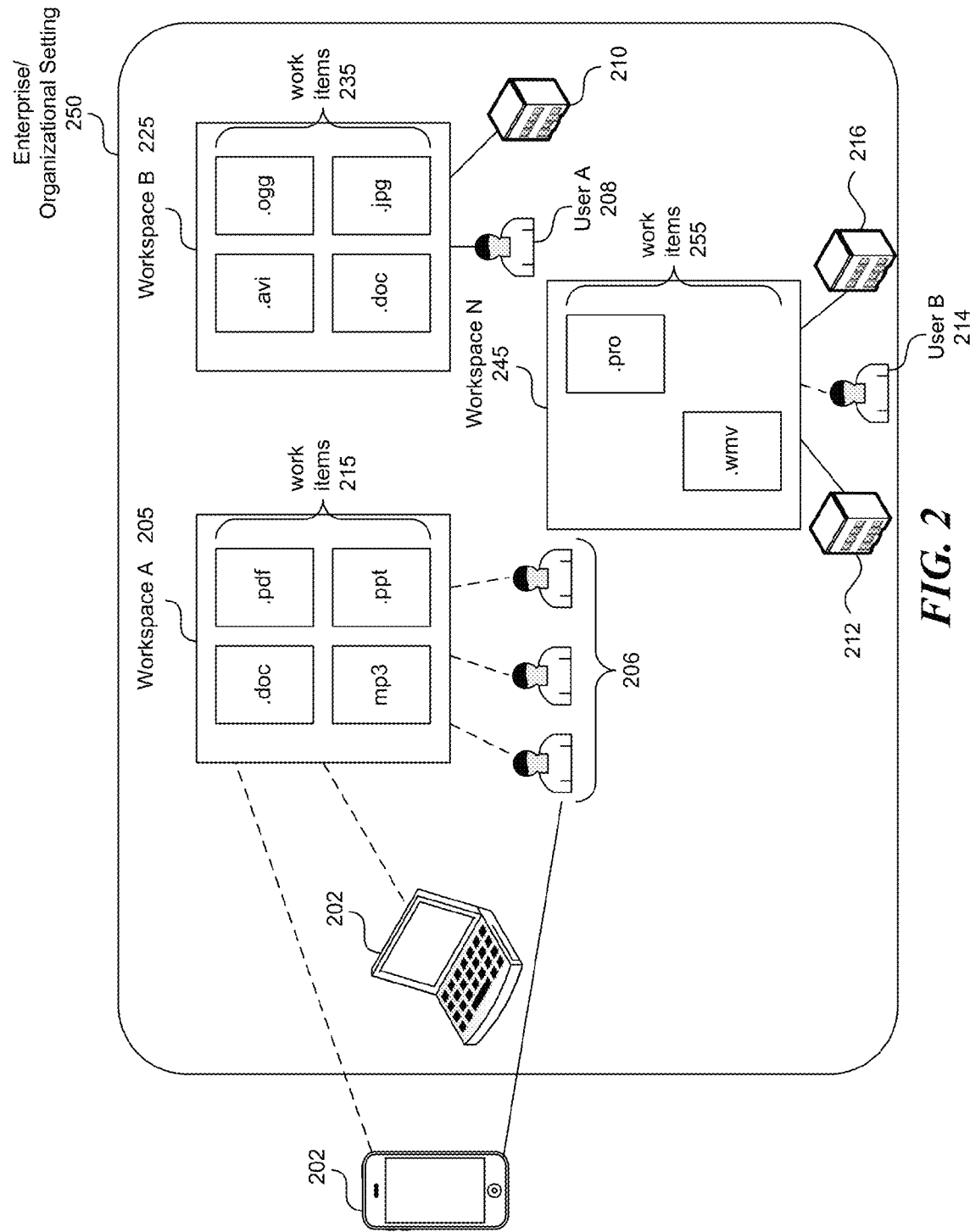
FIG. 2 depicts an example diagram of a web-based or online collaboration platform deployed in an enterprise or other organizational setting for organizing work items and workspaces.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A, B C) can be created to support different projects or a variety of work flows. Each workspace can have its own associate work items. For example, workspace A 205 can be associated with work items 215, workspace B 225 can be associated with work items 235, and workspace N can be associated with work items 255. The work items 215, 235, and 255 can be unique to each workspace but need not be. For example, a particular word document can be associated with only one workspace (e.g., workspace A 205) or it can be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise can be department specific. For example, workspace B can be associated with department 210 and some users shown as example user A 208 and workspace N 245 can be associated with departments 212 and 216 and users shown as example user B 214.

Each user associated with a workspace can generally access the work items associated with the workspace. The level of access depends on permissions associated with the specific workspace, and/or with a specific work item. Permissions can be set for the workspace or set individually on a per work item basis. For example, the creator of a workspace (e.g., one of user A 208 who creates workspace B) can set one permission setting applicable to all work items 235 for other associated users and/or users associated with the affiliate department 210, for example. Creator user A 208 can also set different permission settings for each work item, which can be the same for different users, or varying for different users.

In each workspace A, B . . . N, when an action is performed on a work item by a given user or any other activity is detected in the workspace, other users in the same workspace can be notified (e.g., in real time or in near real time, or not in real time). Activities which trigger real time notifications can include, by way of example but not limitation, adding, deleting, or modifying collaborators in the workspace, uploading, downloading, adding, deleting a work item in the workspace, creating a discussion topic in the workspace.

In some embodiments, items or content downloaded or edited can cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 can be in the same workspace A 205 or the user can include a newly invited collaborator. Similarly, in the same user interface where discussion topics can be created in a workspace (e.g., workspace A, B or N, etc.), actionable events on work items can be created and/or delegated/assigned to other users such as collaborators of a given workspace 206 or other users. Through the same user interface, task status and updates from multiple users or collaborators can be indicated and reflected. In some instances, the users can perform the tasks (e.g., review or approve or reject, etc.) via the same user interface.

Figure 3:
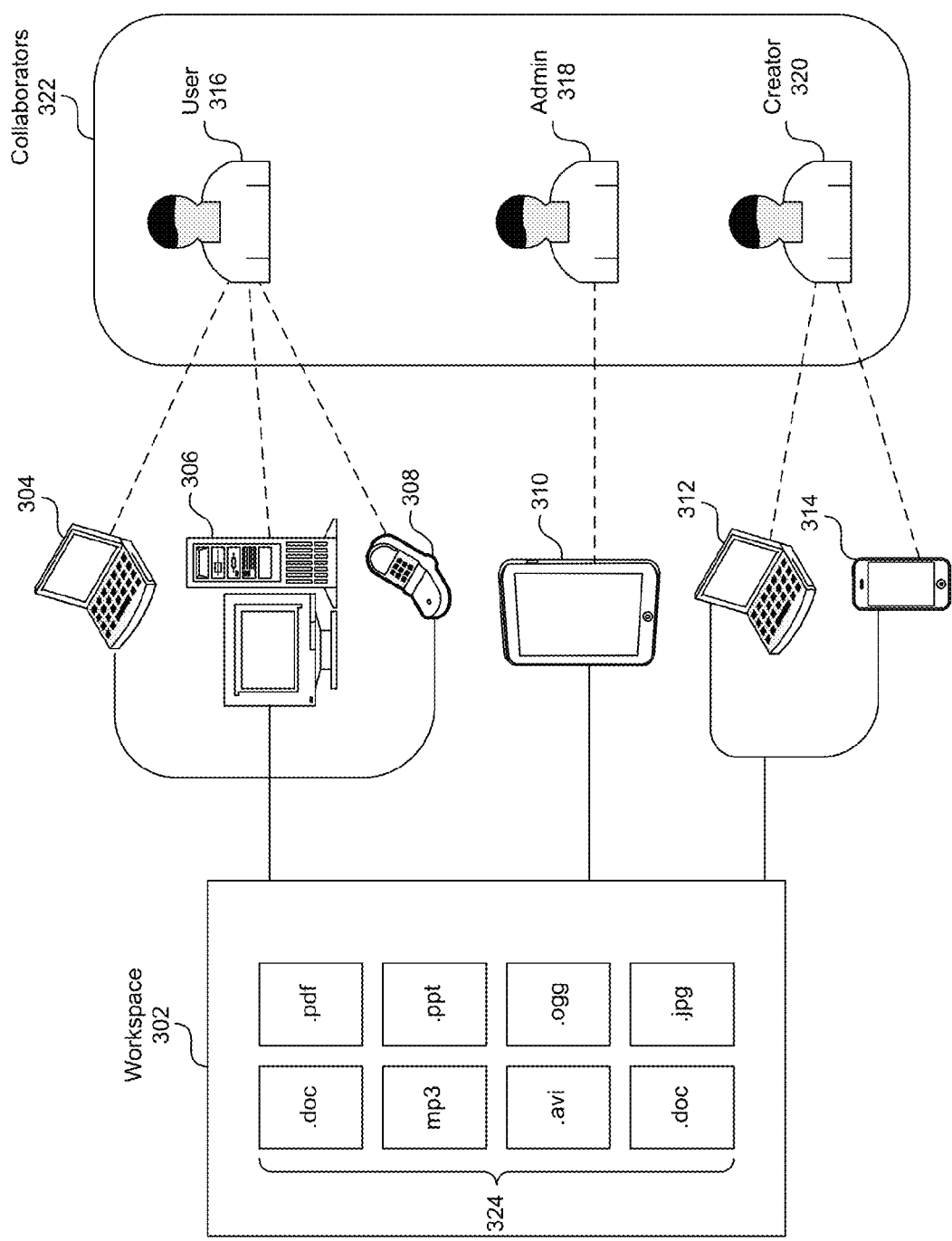
FIG. 3 depicts an example diagram of a workspace in an online or web-based collaboration environment accessible by multiple collaborators through various devices.

FIG. 3 depicts an example diagram of a workspace 302 in an online or web-based collaboration environment accessible by multiple collaborators 322 through various devices.

Each of users 316, 318, and 320 can individually use multiple different devices to access and/or manipulate work items 324 in the workspace 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/loaner device).

Work items to be edited or viewed can be accessed from the workspace 302. Users can also be notified of access, edit, modification, and/or upload related-actions performed on work items 324 by other users or any other types of activities detected in the workspace 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same workspace), either in the same workspace 302 or in some other workspace. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant workspaces, in the same user interface.

Now, with reference to both FIGS. 1 and 3, techniques for a third-party application to access content stored within a cloud-based platform or environment in an integrated, secure manner are described in fuller detail.

As previously mentioned, when user 316 or his/her collaborators 322 desire to access content (e.g., a work item 324) stored in the workspace 302 using a third-party application (e.g., application 120, FIG. 1), the user 316 can send a request to access the work item 324 by first selecting to open the file in workspace 302 using a user interface (e.g., interface 104, FIG. 1) of the workspace 302. According to some embodiments, the user interface 104 is provided via a mobile application, which can be installed on user devices 304-314. In some other embodiments, the user interface 104 is web-based and is accessible by a web browser on user devices 304-314.

In some of those embodiments that include the mobile application, the selected work item 324 is downloaded to the user devices 304-314, and the mobile application has access control over the downloaded work item 324. For example, the mobile application can store the work item 324 on the device or in a memory space (e.g., a cache, a RAM, or a Flash memory) on the devices 304-314, and limits access to the device or the memory space that stores the work item 324 so as to prevent unauthorized reading of, editing to, or modifying of the work item 324. Unauthorized access can include an access from any application not using an application programming interface (API) or a software library/framework that is provided the provider of workspace 302, and/or an access not granted or otherwise controlled by the mobile application. Alternatively, the mobile application can directly access the work item 324 in workspace 302 by temporarily caching the at least partially download file that includes the content of work item 324, a well-known technique that can also be employed in some of those embodiments where the user interface 104 is web-based.

Additionally, the mobile application can launch the third-party application 120 using a controlled launching interface that is different from an application launching interface provided by an operating system of the user devices 304-314 so that additional functionalities can be provided. In some embodiments, the mobile application can prompt (e.g., via the controlled launching interface) the user to select which third-party application the user wishes to use for accessing or content editing. The selection prompted can include, for example, a plurality of applications already installed on user devices 304-314, and/or can include one or more suggested applications for the user to download and install. Further, the selection can be based on a type (e.g., a documentation (.doc), a presentation slide (.ppt), or a video clip (.avi)) of the work item 324 that the user currently selects for accessing.

Then, the mobile application provides (e.g., in response to a request sent by the launched third-party application 120 via the provided API or the software library/framework, or automatically as a part of the controlled launching mechanisms of the user interface 104) the file to the third-party application 120 for one or more actions (e.g., accesses or edits) to be performed on the file by the third-party application 120, and in the meantime, the mobile application also restricts the third-party application 120 to store the accessed file or content back to the workspace 302. In some embodiments, the mobile application restricts the third-party application 120 by an operating system (OS) level hook, or the API/software library/framework restricts the third-party application 120 so that any sharing or saving mechanisms of the third-party application 120 other than storing back to the workspace 302 is prohibited. For purposes of discussion herein, a "software hook" or "hooking" includes various suitable techniques known to a person having ordinary skill in the art to alter or augment the behavior of the OS and of the third-party applications 120 by intercepting function calls or messages and/or events passed between components of the OS and the third-party applications 120.

Figure 4:
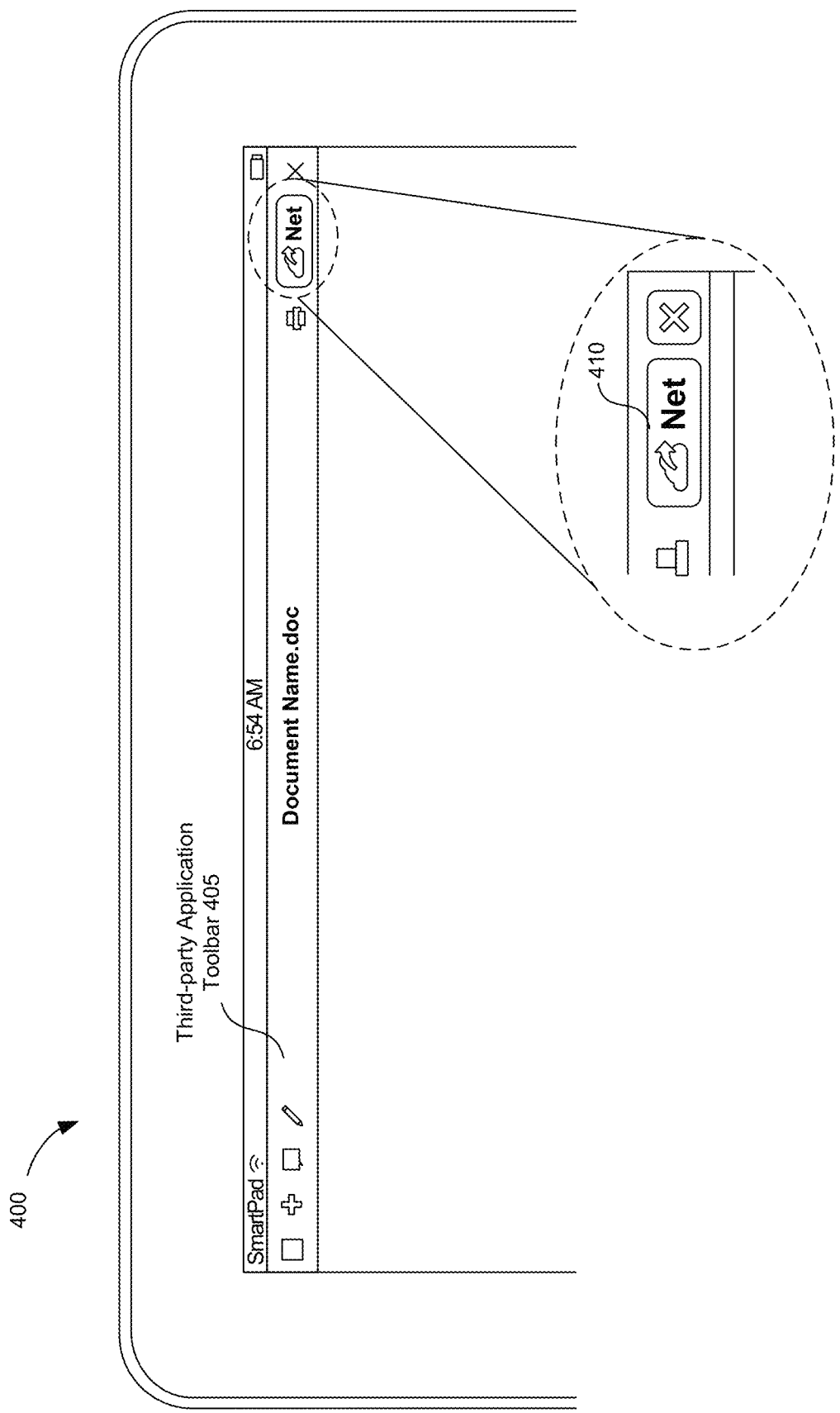
FIG. 4 depicts an example screenshot illustrating a user interface which enables a third-party application to access content within a cloud-based platform in an integrated manner.

Further, in some embodiments, the third-party applications 120 include a user interface which is customized to enable storage of the accessed file (e.g., work item 324) back to the cloud-based environment (e.g., workspace 302). One example of this customized user interface which enables the third-party application 120 to store back accessed content to the workspace 302 is illustrated in FIG. 4, which includes a partial screenshot 400 of the third-party application 120. The third-party application shown in FIG. 4 includes a third-party application toolbar 405, which in turn includes a designated, selectable button 410 to enable the store back. In some implementations, the toolbar 405 is customized so that no other navigation or option (e.g., save locally, save to another location, or share via email, etc.) is available. In some implementations, the third-party application is provided in a customized view, and the customized view constrains the third-party application 120 to save the content back to the workspace 302.

After the user accesses or edits the work item 324 using the third-party application 120 (e.g., provided in a customized view, and/or with a customized toolbar 405), and after the user selects the designated button 410, the mobile application retrieves the work item 324 from the third-party application 120. Additionally, all the metadata, for example, tags or other data which characterize the work item 324 such as who the author and collaborators are, or version histories, are retrieved back along with the work item 324. The metadata can also include information about the file or work item 324's location and its storage in the cloud-based platform (such as workspace 302 provided by the host server 110) including, for example, folder identifier (ID), file ID, folder path to the file, file name, folder name and/or any other identifying information. Additionally, the metadata can include information about how to control the data for security purposes including, for example, whether the file or the work item 324 can be stored in the third-party application 120, or whether the file or work item 324 needs to be sent back to the workspace 302 immediately without leaving any temporary or cache copies. Another example of such information is whether the file can be shared out to other third-party applications. In some embodiments, copies created by the third-party application 120 during the access, if any, are deleted after the edited or accessed work item 324 is retrieved (e.g., based on the information contained in metadata). According to one or more embodiments, the retrieval is performed using the software library provided by the provider of workspace 302.

After the mobile application retrieves the work item 324, it can manage the upload back to a host server (e.g., host server 110, FIG. 1) which hosts the workspace 302. For example, the mobile application can open an upload dialog view pointing a folder the user originally stores the work item 324. The user then selects upload, and the work item 324 is stored back to the workspace 302 through the mobile application. In some embodiments, the mobile application can determine whether the server 110 is accessible. If the server 110 is determined accessible, then the mobile application transmits the retrieved work item 324 to the server, and deletes the memory space on the user devices 304-314 that originally stores the work item 324. If the server 110 is determined inaccessible, then the mobile application retains the retrieved work item 324 from the device or in the memory space of the device until the server 110 becomes accessible.

In this way, the mobile application implementing the techniques disclosed herein acts as a mediator between the workspace 302 and the third-party applications 120, manages uploads and downloads, and ensures that file transfer happens securely through the software API/library/framework provided by the provider of workspace 302. As said above, the disclosed techniques grants the third-party applications 120 access to content of the cloud-based platform and ensures security by providing no sharing or saving mechanism other than storage back to the cloud-based platform to the third-party application 120. The disclosed techniques also include deletion of files on user devices 304-314 once the files are retrieved and transferred back to the cloud-based platform. Also, since upload management such as all uploading activities, errors, and retries are controlled and performed by the mobile application, developers of the third-party applications 120 can benefit from the reduced workload in designing such uploading functionalities.

In another aspect of the present disclosure, the disclosed techniques include providing the third-party application 120 with access to the cloud-based collaborative environment (e.g., workspace 302) where the third-party application is provided to the users as a web-based application (e.g., accessible via a web browser). The third-party application can be running on the host server 110 or on a separate third-party application server.

In some embodiments, a system implementing the disclosed techniques can, responsive to a request to access or edit a work item 324 in the workspace 302, grant access of the work item 324 to the third-party application 120. The request of access or edit of the file is from any one of a collaborator 322 of the file. The third-party application 120 can include a user interface (e.g., toolbar 405, FIG. 4) which is customized to enable storage of the accessed or edited work item 324 to the cloud-based environment such as workspace 302.

More specifically, in some embodiments, the third-party application 120 is integrated with the workspace 302 such that the work item 324 accessed or edited using the third-party application 120 through the workspace 302 is restricted to be stored back to the workspace 302 after the access or edit. In one or more embodiments, the work item 324 is retrieved, from the third-party application 120 after the work item 324 is accessed or edited, to be viewed via a web application to the workspace 302. The storage of the accessed or edited file (or work item 324) to the cloud-based environment (or workspace 302) includes metadata.

Moreover, according to some embodiments, after the access or the edit using the third-party application 120, the work item 324 is uploaded to the cloud-based workspace 302 for storage. During or after the access or the edit of the file using the third-party application 120, sharing or saving mechanisms of the third-party application 120 is prohibited by the cloud-based environment.

In some examples, copies of the file not stored in the cloud-based environment after the access or the edit are deleted. Additionally or alternatively, the cloud-based environment can manage uploads of files accessed and edited using the third-party application 120 back to the cloud-based environment. In some examples, the cloud-based environment can also manage error handling of file access or file edits using the third-party application 120.

Further, in some embodiments disclosed herein, the third-party application can be selected by the user of the cloud-based environment among multiple third-party applications available for selection in the cloud-based environment. In addition, the third-party application 120 can be authored by a partnering entity of the provider of the cloud-based platform. In a mutually beneficial manner, those third-party applications which adhere to guidelines and/or policies in implementing secured access of the cloud-based platform (e.g., by using API/software library/software framework as provided by the cloud service provider) can get promoted or advertised by the provider of such cloud-based platform. As an option, the third-party application 120 can be provided within a view (e.g., similar to the interface as shown in FIG. 4) which constrains the third-party application 120 to save the content back to an original location of the file.

Figure 5:
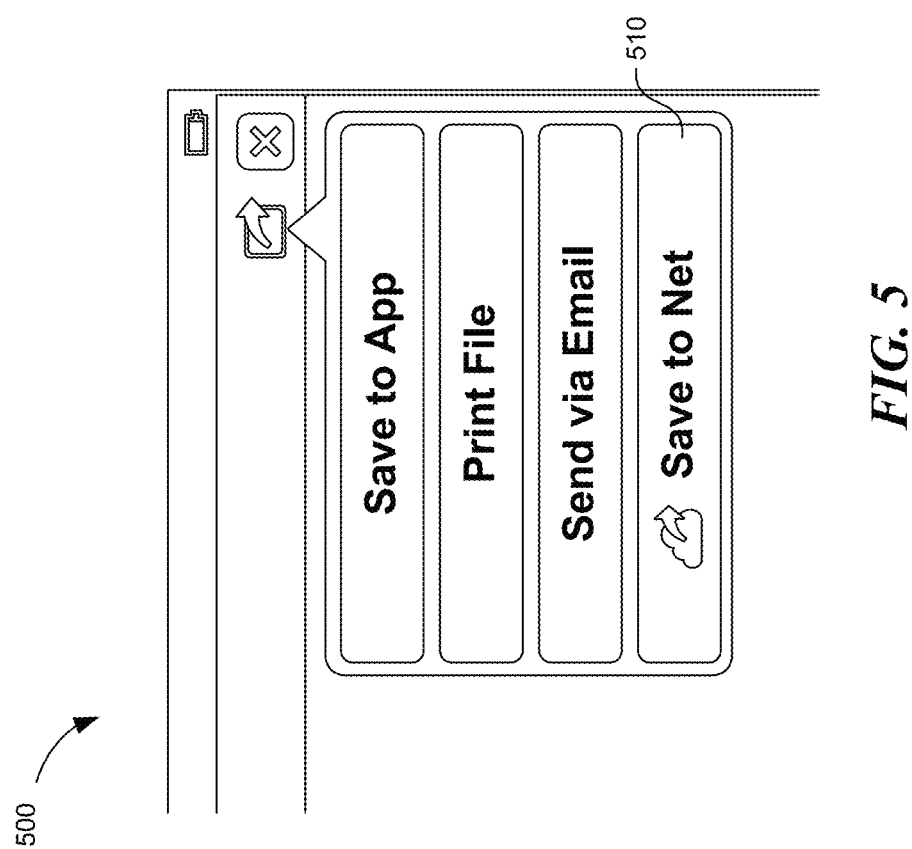
FIG. 5 depicts an example screenshot illustrating another user interface which enables a third-party application to access content within a cloud-based platform.

In yet another aspect of the present disclosure, an option is provided in a user interface of the third-party application 120 for accessing the cloud-based platform. An example of such option is illustrated as option 510 in screenshot 500 of FIG. 5. As shown in FIG. 5, the user interface of third-party application 120 is customized to include the option 510 to save content accessed using the third-party application 120 to the cloud-based platform. In response to activation of the option, the mobile application receives the file from the third-party application 120 (e.g., which is installed on user devices as a mobile application or is provided as a web-based application). This technique is especially useful in those embodiments where the user interface 104 is provided via the mobile application (such as the one described above), and when the user desires to edit and upload a local file to the cloud-based platform such as workspace 302 in an integrated, secure manner. In some of these embodiments, the mobile application manages the uploading the file to the cloud-based platform (e.g., determining whether a server hosting the cloud-based platform is accessible and corresponding actions in response to results from the determination) in a similar manner described above.

Additionally, in some embodiments, if the option is selected by the user, and yet the mobile application is not installed on the user's device, then a link is populated or presented to the user to prompt the user to install the mobile application so that the uploading can be handled.

Depending on the application, in some alternative embodiments, the user interface of the third-party can still limit the third-party application 120 to save the content accessed using the third-party application 120 to the workspace 302 or a server hosting the third-party application 120. In some implementations, the user interface prevents sharing of the content accessed using the third-party application besides saving the content. The user interface of the third-party application can be customized using tools provided by the cloud-based platform. Additionally or alternatively, the third-party application is provided within a view by the cloud-based environment, and the view constrains the third-party application to save the content back to an original location of the file.

In an additional aspect of the present disclosure, another configuration of the third-party application 120 can be adopted which can further enhance information security of the work item 324. In this configuration, the third-party application 120's normal operations involve the third-party application 120 operating on, for example, the user devices 304-314, and a server being associated with the third-party application 120 (or a "third-party application server") to supply or supplement data/information that facilitates the normal operations of the third-party application 120. In some embodiments, the server associated with the third-party application 120 is operated by a vendor or an author entity of the third-party application 120.

Figure 10:
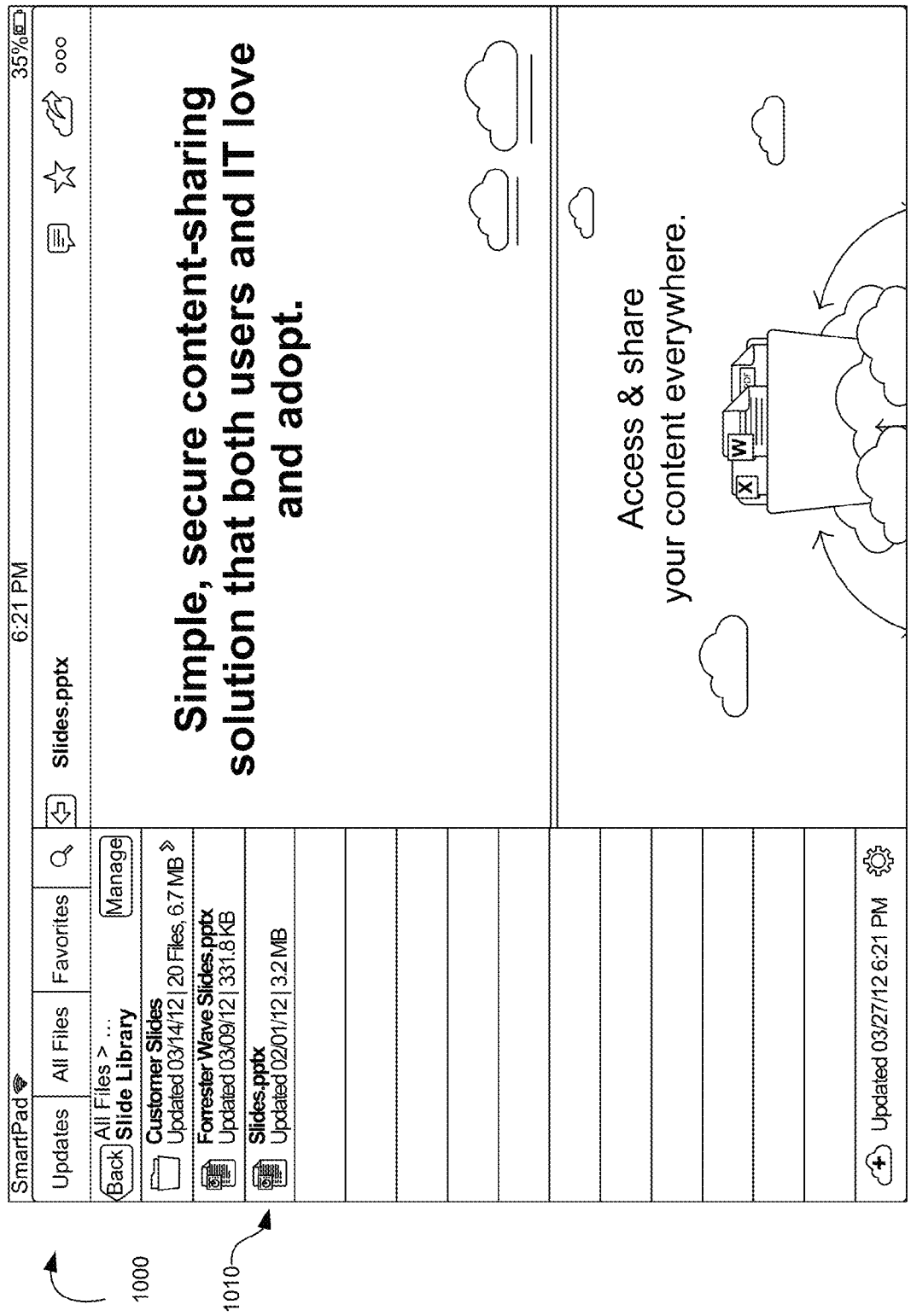
FIG. 10 depicts an example screenshot illustrating an user interface of the cloud-based platform.

In some of the embodiments, when user 316 or his/her collaborators 322 desire to access content (e.g., a work item 324) stored in the workspace 302 using a third-party application (e.g., application 120, FIG. 1), the user 316 can first select to open the file or work item 324 in workspace 302 using a user interface (e.g., interface 104, FIG. 1) of the workspace 302. Similar to some embodiments described above, the user interface 104 can be provided via a mobile application, or can be web-based and accessible by a web browser on user devices 304-314. An example of such user interface 104 that is provided via the mobile application is illustrated in screenshot 1000 of FIG. 10.

Figure 11:
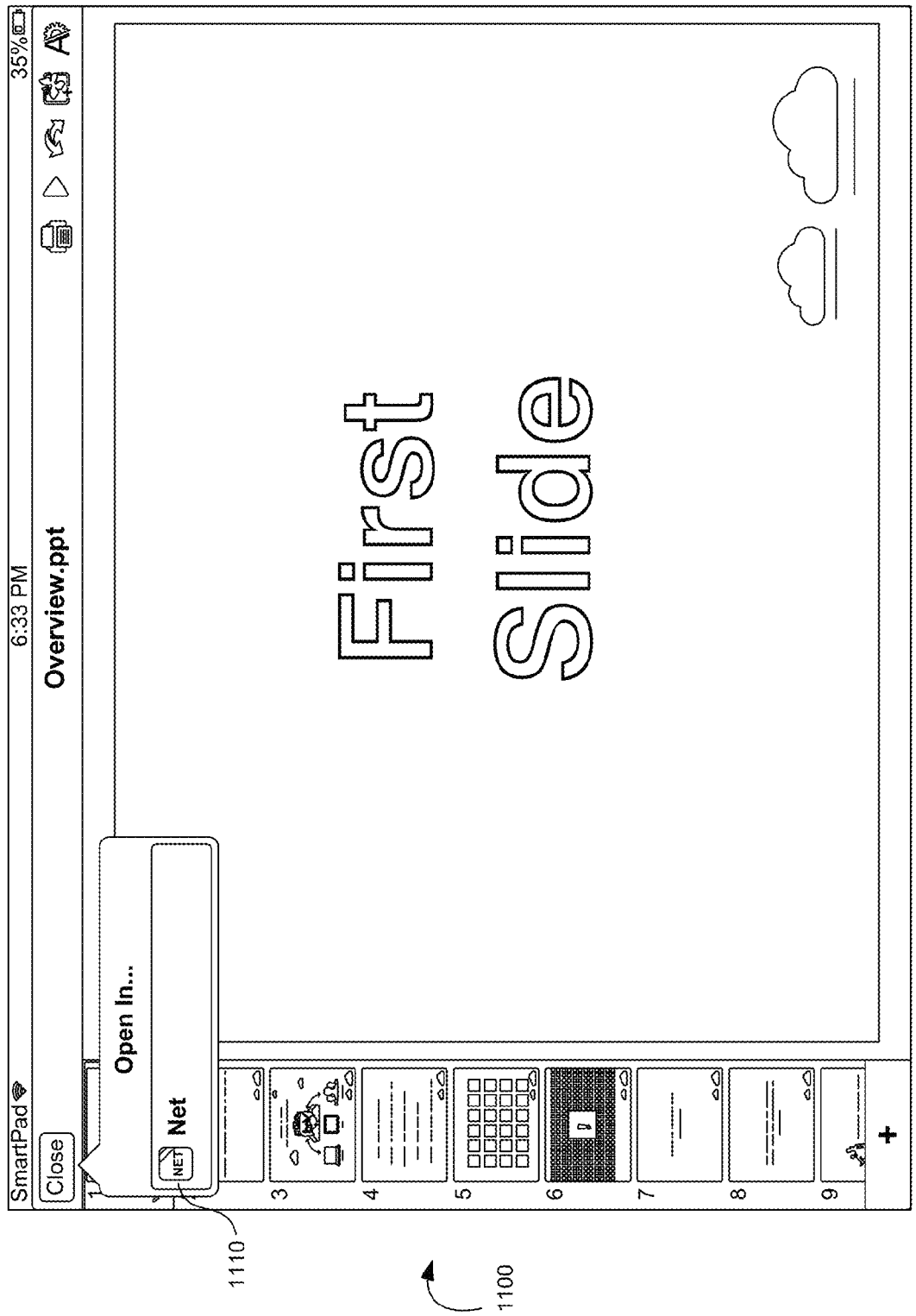
FIG. 11 depicts an example screenshot illustrating a third-party application integrated with an interface that enables access to content within a cloud-based platform.

Then, when the user selects the file in the user interface 104 (e.g., via one or more tapping on file 1010, FIG. 10) for accessing (e.g., for viewing, editing, signing, etc.), the mobile application can prompt the user to choose which third-party application 120 that he or she desires to use. Thereafter, the user devices 102 launches the third-party application 120 (e.g., application 1100 shown in FIG. 11), which can communicate with the third-party application server and the host server 110 so that the third-party application 120 can access the work item 324 through the third-party application server.

Figure 12:
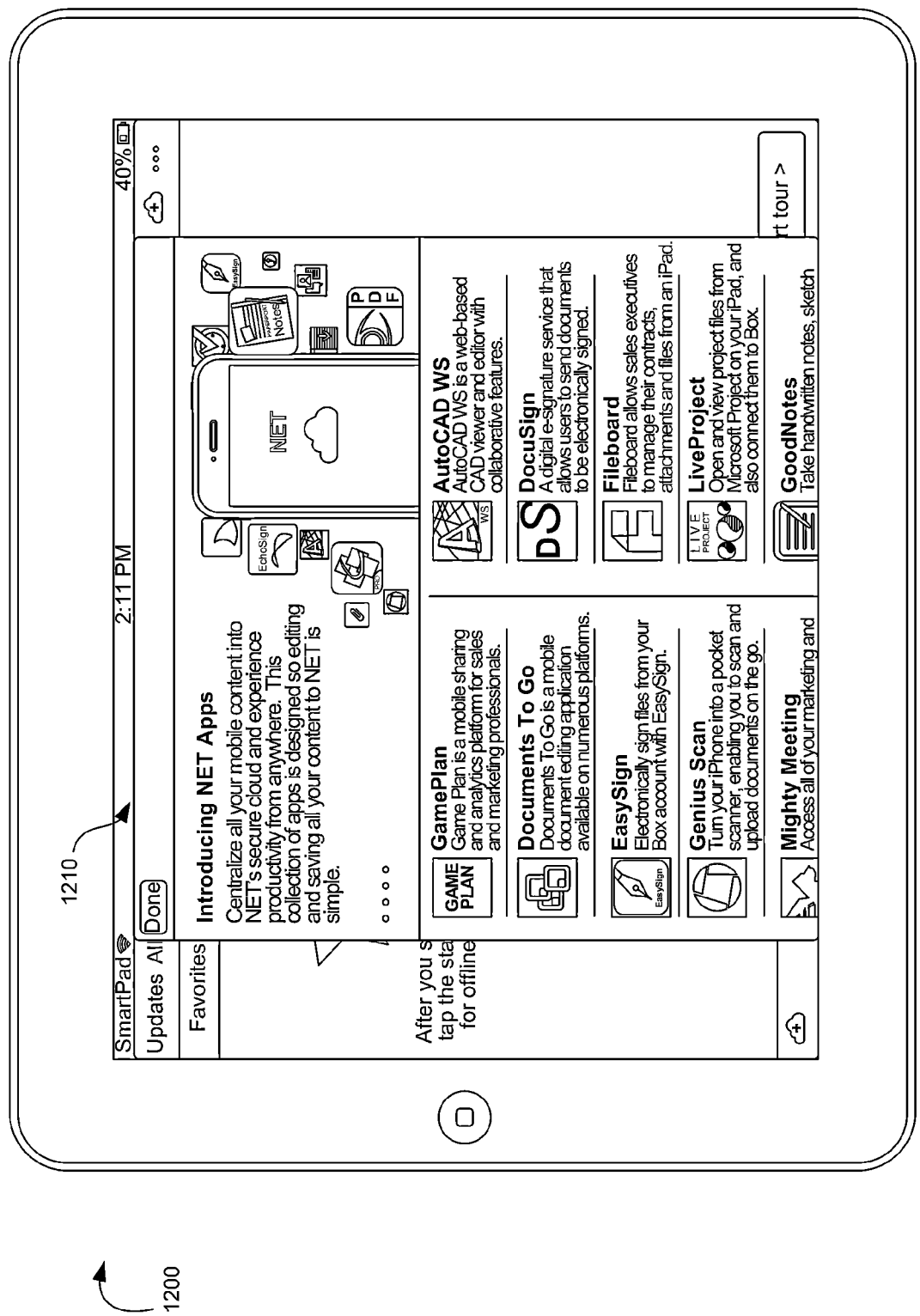
FIG. 12 depicts an example screenshot illustrating a list of approved third-party applications which can be authored by partnering entities.

According to one or more embodiments, the third-party application 120 is listed in a list of approved third-party applications. Some embodiments provide that the third-party application 120 is launched on the user devices 102 using a controlled launching interface that is different from an application launching interface provided by an operating system of the user devices 102. In one or more embodiments, if such approved third-party application 120 is not currently installed on the user device 304-314, then at least a portion of the list of approved third-party applications can be populated in the controlled launching interface (or, alternative or additionally, in another separate interface, e.g., an application store as provided by the OS of device 304-314, or an application gallery which can be provided by the third-party application 120) for downloading. An example of such application gallery containing approved third-party applications is illustrated in a screenshot 1200 of FIG. 12 as interface 1210.

Upon the user's selection, the mobile application (which can be also referred to as a "mobile client" herein) sends metadata that identifies the work item 324 to the third-party application 120. After receiving the metadata from the mobile application, the third-party application 120 transmits the metadata to the third-party application server, which in turn utilizes those metadata to request the work item 324 from the host server 110. That is to say, the third-party application server can request the work item 324 from the host server 110 by transmitting the metadata to the host server 110.

Next, the host server 110 returns the requested work item 324 as identified by the metadata to third-party application server. After receiving the requested work item 324 from the host server 110, third-party application server communicates with and/or renders information to the third-party application 120. More specifically, the third-party application server transmits at least a portion of the file or work item 324 to the third-party application 120 for one or more actions to be performed on the portion of the work item 324. In some embodiments, the part of the work item 324 received by the third-party application 120 includes information that is capable to create a view of at least a partial content of the work item 324. For example, the information can be capable to generate several views of a PDF file, a first few slides of a Powerpoint presentation, a number of pages of a Word document, and so forth. In some embodiments, the part of the work item 324 received by the third-party application 120 includes data that are included the file. Some embodiments of the third-party application server is to transmit the entire file instead of a portion of the file.

After the access, the third-party application 120 transmits the work item 324 back to the third-party application server. In some alternative embodiments, the third-party application 120 transmits only an accessed portion of the work item 324 back to the third-party application server to conserve network resources. The third-party application receives the accessed portion of the work item 324 from the third-party application 120, and saves the accessed file or content back to the host server 110.

The third-party application 120 can also launch/awake/switch to the mobile application and notifies the mobile application to reload the work item 324 from the host server 110.

As a part of the security enhancing features, the third-party application 120 can receive an instruction from the cloud-based environment (e.g., from the host server 110) to delete the received part of the work item 324. In another example, the third-party application 120 may be restricted the to store the received content back to the cloud-based environment. In some embodiments, the third-party application server can keep a history of the access. The history can includes information regarding, for example, which third-party application accessed what content through what method from what location at what time.

As additional or alternative embodiments, upon returning to the third-party application 120, the mobile application can prompt user 316 when it is about to discard previously opened content. More specifically, when user 316 works on a file passed from the mobile application of the cloud-based environment and subsequently exits the third-party application 120 without saving or closing the edit view, if the user 316 returns to the third-party application 120, the mobile application can allow the user 316 to continue editing. For example, activating "close" (e.g., button 1110, FIG. 11) from this view can either return to the mobile application (e.g., shown in screenshot 1000, FIG. 10) or return to a main view (not shown for simplicity) of the third-party application 120. If the user 316 opens another file from the mobile application, the user 316 is to be prompted on whether or not to discard the previously worked-on file or content.

In still another aspect of the present disclosure, among others already mentioned above, some additional or alternative methods and apparatuses can provide a third-party application with access to content in a cloud-based environment without the need of having a mobile application (or a mobile client) installed on the user devices 304-314. According to some embodiments, a mobile application framework/API/library can enable the third-party application 120 to directly access (e.g., opens, edits, saves back, etc.) the work item 324 in a cloud-based environment such as workspace 302.

It is noted that the third-party application 120 is hosted by an entity different from that of the cloud-based environment, and the direct access to the content in the cloud-based environment is provided to the third-party application 120 and accomplished without a need to access an application (e.g., the mobile application/mobile agent) that is native to the cloud-based environment. The direct access to the content includes direct save of the content to or retrieval of the content from the cloud-based environment. Other examples of the direct access to the content can include, but not limited to, previewing the content in the cloud-based environment, collaborating on the content in the cloud-based environment among multiple collaborators of the user. In some embodiments, the direct access is provided through a web interface of the third party application. In some other embodiments, the direct access is provided through integration of the third-party application with an application program interface (API) or web API provided by the cloud-based environment. The application program interface or the web API can be further used for one or more of navigation, file management, file transfer, collaboration in the cloud-based environment, and/or for caching in the cloud-based environment.

Generally speaking, the embodiments of third-party application 120 that implement these direct-access techniques, which can be authored by a "partnering entity," are better written applications in terms of quality and/or functionality, and they generally have a more complete, secure integration (in various manners that are discussed herein including, for example, remote delete, or limited saving/sharing mechanisms, etc.) with the workspace 302. These applications may be endorsed and put on a list of approved third-party applications. Further, they may be populated or advertised using the controlled launching interface or a separate downloading interface as above described.

For example, some of these third-party application 120 (e.g., application 1100 shown in FIG. 11) can bring the benefit of convenience and security by making the user experience simple to edit files using a mobile device. Those changes made from the mobile device can be saved back to workspace 302 automatically. As mentioned, workspace 302 can also enable the user 316 (and collaborators 322) to add annotations to important documents, highlight and make notes on work items 324, and/or save back to workspace 302 so that all collaborators 322's work progresses are aligned.

More specifically, to access the work item 324 in the workspace 302, the third-party application 120 can transmit a request to the host server 110. In some embodiments, a vendor of the third-party application 120 can, for example, pre-register with the host server 110 so that an API key that identifies the third-party application 120 (or the vendor of the application 120) can be received.

During third-party application 120's normal operation, application 120 can use the API key to first request from the host server 110 a ticket. For one example, the third-party application 120 can make the following API call: GET https://www.box.com/api/1.0/rest?action=get_ticket&api_key=[API KEY] and the third-party application 120 may receive from the host server 110, for example, an XML response that contains the ticket.

In one or more embodiments, the ticket automatically expires after a predetermined amount of time, for example, 10 minutes. After receiving the ticket, the third-party application 120 then makes the request, which includes the ticket, to the host server 110 for a login view.

In response to such request, the host server 110 can provides the third-party application 120 with the login view to verify an identity of a user. The login view is generated from the host server 110. For example, the third-party application 120 can include a login view controller which embeds a web view and handles the whole login process. In one embodiment, the provided login view is embedded in an interface of the third-party application 120.

Further, in some embodiments, the login view is provided based on whether the user is logged into the cloud-based environment. According to some embodiments, the login view is provided if the user is not logged into the workspace 302.

Then, upon the verification of the user's identity, the host server 110 provides the requested work item 342 to the third-party application 120. In some embodiments, to further security, when the host server 110 determines that it is the third-party application 120 which sends out the request, the host server 110 only responds to such request if the third-party application 120 is listed in a list of approved third-party applications.

Additionally or alternatively, the host server 110 further transmits an authentication token to the third-party application 120 after the user's identity is verified. In some embodiments, the workspace 302 is encrypted, and the authentication token includes a decryption key to decrypt the workspace 302. Some examples of such encryption/decryption algorithms include AES, DES, as well as other suitable cryptologic algorithms. Some implementation of the authentication token can automatically expire after a certain period of time, which may be predetermined, and/or may be dynamically and automatically selected. In some embodiments, the authentication token does not expire over time, and the third-party application 120 can therefore store the authentication token for future use, so that user 316 only needs to authenticate with the third-party application 120 once. The authentication tokens can be deleted, for example, when user 316 "logs out", when re-authenticating a user, or when the user removing the third-party application 120 manually.

The third-party application 120 can store the authentication token in a "keychain" or other suitable, secure storage after receiving the authentication token. Then, either the host server 110 or the third-party application 120 or both can detect presence of the authentication token that is previously sent and still valid. In some embodiments, the login view is not generated again by the host server 110 if, upon receiving a subsequent request from the application 120 to access the workspace 302, the authentication token is present on the third-party application 120.

In manners similar to those already discussed above, some embodiments of the third-party application 120 has a user interface customized to enable storage of the accessed content back to the cloud-based environment. Moreover, in one or more embodiments, the third-party application 120 is listed in a list of approved third-party applications.

Further, the host server 110 can keep a history of the access, such as information regarding which third-party application accessed what content. The third-party application can also receive an instruction from the cloud-based environment to delete the received content (e.g., work item 324). The third-party application 120 is restricted to store the received work item 324 back to the workspace 302.

Overall, among other features, the third-party application 120 provides independent encryption of the files in the mobile application (or mobile client) of the workspace 302 and/or the third-party application 120. It can support remote wipe and logout to ensure content downloaded (if any) from the workspace 302 can be removed if so desired. Some embodiments also provide that only a specified list of trusted (e.g., approved by administrator) applications can access the cloud-based workspace 302. The administrator can also specify from which devices 304-314 user 316 can access the workspace 302. The host server 110 can provide audit trail to track which third-party applications 120 and/or user 316 accessed what content. Data leakage can be prevented by, in some embodiments, only allowing sharing and collaboration through the mobile application of the workspace 302 or an approved third-party application 120. With the embodiments disclosed herein, security audits or reports can be generated (e.g., from those tracking histories) by either the third-party application 120 or the host server 110 for administrative reviews. Administrators can oversee devices 304-314 and installed third-party applications 120 remotely.

In some embodiments, the third-party applications 120 can further set tiers for its users based on one or more suitable criteria. For example, if a partnering third-party application 120 (or an approved application) does not require certain security or user interface functionality for free users, the application 120 can still provide those additional functionalities or can selectively enforce those security restrictions for paid customers (e.g., employees whose employers pay for the software) if applicable administrators set so.

In this way, the users can enjoy the flexibility in selecting the third-party applications they so prefer, which potentially enables the users to perform a wider variety of tasks on the files from a location and/or a device of their preference. Also, because the files are stored and managed and/or controlled in the cloud-based platform, business enterprise users or administrators can also enjoy the security assurances from having unified, standardized, and integrated access controls over content stored in the cloud-based platform.

Figure 6:
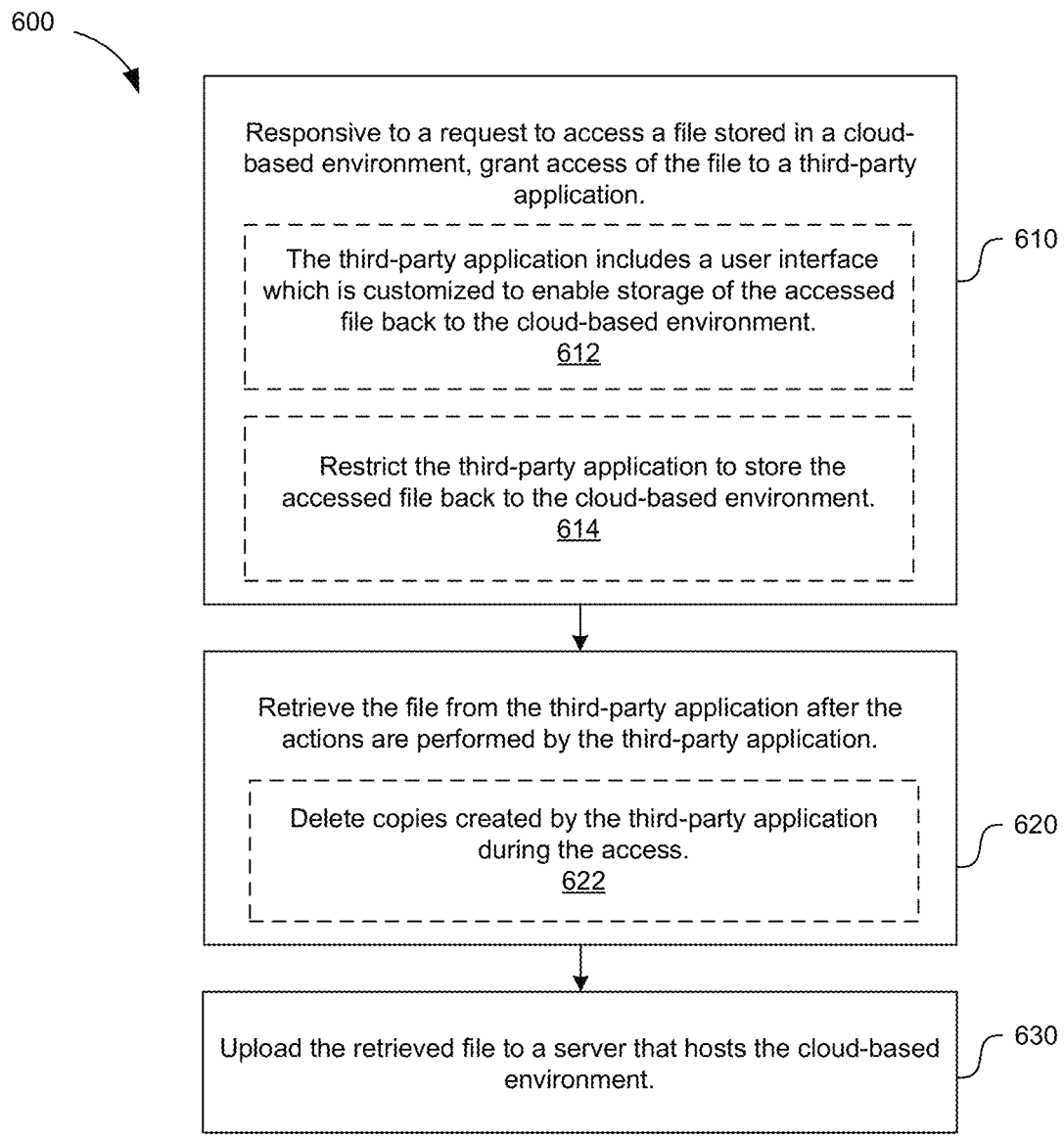
FIG. 6 depicts a flowchart illustrating an example process for a third-party application to access content within a cloud-based platform in an integrated manner.

FIG. 6 depicts a flowchart illustrating an example process 600 for a third-party application to access content within a cloud-based platform in an integrated manner. For example, a user wishes to access or edit content (e.g., a file) stored in a cloud-based environment/platform using a third-party application (e.g., a photo editor, or a word processor).

First, with reference to FIGS. 1, 3-5, the user (e.g., user 316, FIG. 3) selects to open or access the file (e.g., work item 324, FIG. 3) using a user interface (e.g., interface 104, FIG. 1) of the cloud-based environment (e.g., workspace 302, FIG. 3), which can be hosted by a server (e.g., host server 110, FIG. 1). The interface 104 can be generated by an agent application (e.g., a mobile application, or a web application) of the workspace 302 and has access thereto. Then, the user 316 may select which third-party application (e.g., application 120, FIG. 1) that the user 316 wants to use. In some embodiments, the selection made available to the user 316 is filtered based on a type of the work item 324. In some embodiments, the selection can be made automatically without user input, or can be made based on a prior input from the user 316, an administrator (e.g., administrator 318, FIG. 3), or from other suitable sources. In some embodiments, the selection menu for selecting which third-party application 120 to launch is a controlled launching interface that is separate from an application launching interface provided by an operating system (OS) of the user 316's devices (e.g., devices 102, FIG. 1; devices 304-314, FIG. 3).

Then, the agent receives a request to access the work item 324 stored in the workspace 302. The request can be made from the third-party application 120, or the file opening process can be made automatic so that no express request from the third-party application 120 is necessary (e.g., the request can be made from OS calls, or from other suitable mechanisms). In all cases, in response to the request to access the work item 324 in the workspace 302, the agent grants (610) access of the work item 324 to the third-party application 120. In some embodiments, the third-party application 120 includes a user interface (e.g., a third-party application toolbar 405 which includes a designated button 410) which is customized to enable storage of the accessed work item 324 back to the workspace 302. In some embodiments, the agent restricts (614) the third-party application 120 to store the accessed work item 324 back to the workspace 302. The restriction can be performed, for example, by an OS level hook, or by other suitable means.

After the third-party application 120 performs accesses or edits to the work item 324, the agent retrieves (620) the work item 324 from the third-party application 120. In some embodiments, the agent deletes (622) copies created by the third-party application 120 during the access. Next, the agent uploads (630) the retrieved work item 324 to the host server 110 that hosts the workspace 302.

Figure 7:
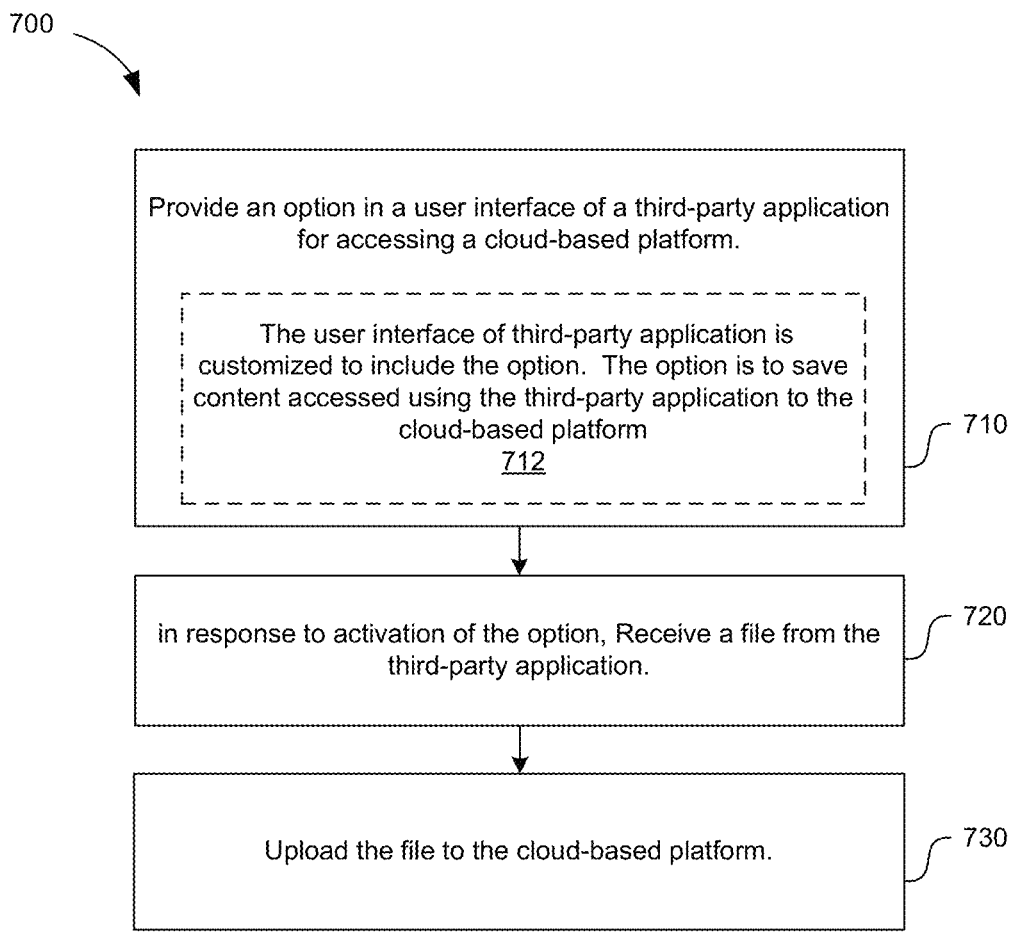
FIG. 7 depicts a flowchart illustrating another example process for a third-party application to access content within a cloud-based platform in an integrated manner.

FIG. 7 depicts a flowchart illustrating another example process 700 for a third-party application to access content within a cloud-based platform in an integrated manner. For example, when a user desires to edit and upload a local file to a cloud-based platform.

First, with reference to FIGS. 1, 3-5, an agent application (e.g., a mobile application, or a web application) of the cloud-based platform (e.g., workspace 302, FIG. 3) can provide (710) an option (e.g., option 510, FIG. 5) in a user interface of a third-party application (e.g., application 120, FIG. 1) for accessing the workspace 302. Examples of the providing include any kind of suitable internal or external communication channels between the agent and the third-party application 120 including, for example, an application programming interface (API), a software library, a software framework which the third-party application 120 can adopt, and so forth. In some embodiments, the user interface of third-party application 120 is customized to include the option to save content accessed using the third-party application 120 to the workspace 302, which is hosted by a server (e.g., host server 110, FIG. 1).

Then, in response to activation of the option, the agent receives (720) a file from the third-party application 120. Next, the agent uploads (730) the received file to the host server 110 that hosts the workspace 302. Additionally or alternatively, if the option is activated and if the agent is not present, then a link is presented to the user (e.g., user 316, FIG. 3) to install the agent to handle the uploading.

Figure 8:
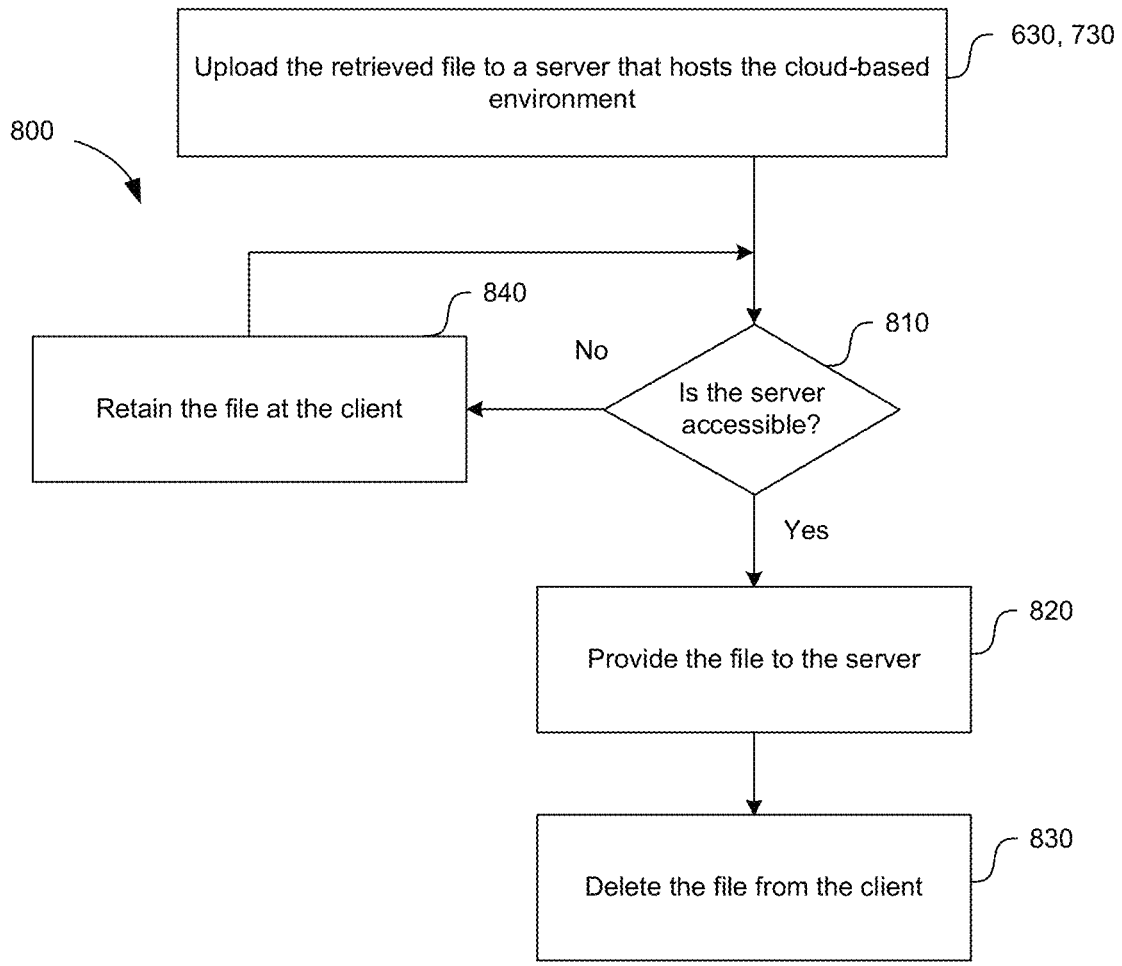
FIG. 8 depicts a flowchart illustrating further details which can be adopted by the processes of FIG. 6 or FIG. 7 in accordance with some embodiments.

FIG. 8 depicts a flowchart illustrating further details which can be adopted by the processes of FIG. 6 or FIG. 7 in accordance with some embodiments.

Continuing with the examples discussed with respect to processes 600 and 700, in some embodiments, the agent can employ process 800 of FIG. 8 when the agent uploads the retrieved or received file(s) to the host server 110.

First, the agent determines (810) whether the host server 110 hosting the workspace 302 is accessible. If the host server 110 is determined accessible, then the agent transmits (820) the retrieved or received file(s) to the host server 110. In addition, the agent deletes (830) the file the device or from a memory space of the client's user devices 102, 304-314 that stores the file.

On the other hand, if the host server 110 is determined inaccessible, then the agent retains (840) the file on the user device or in the memory space of the client's user devices 102, 304-314 until the host server 110 becomes accessible.

Overall, the techniques disclosed herein provide both accessibility of content within a cloud-based workspace to third-party applications and controllability over the manner of the third-party applications' accesses, thereby allowing the users to enjoy the freedom and benefit of choosing their own preferred programs from a wide-variety of third-party applications while maintaining or enhancing the security of the content stored within the cloud-based workspace.

Figure 13:
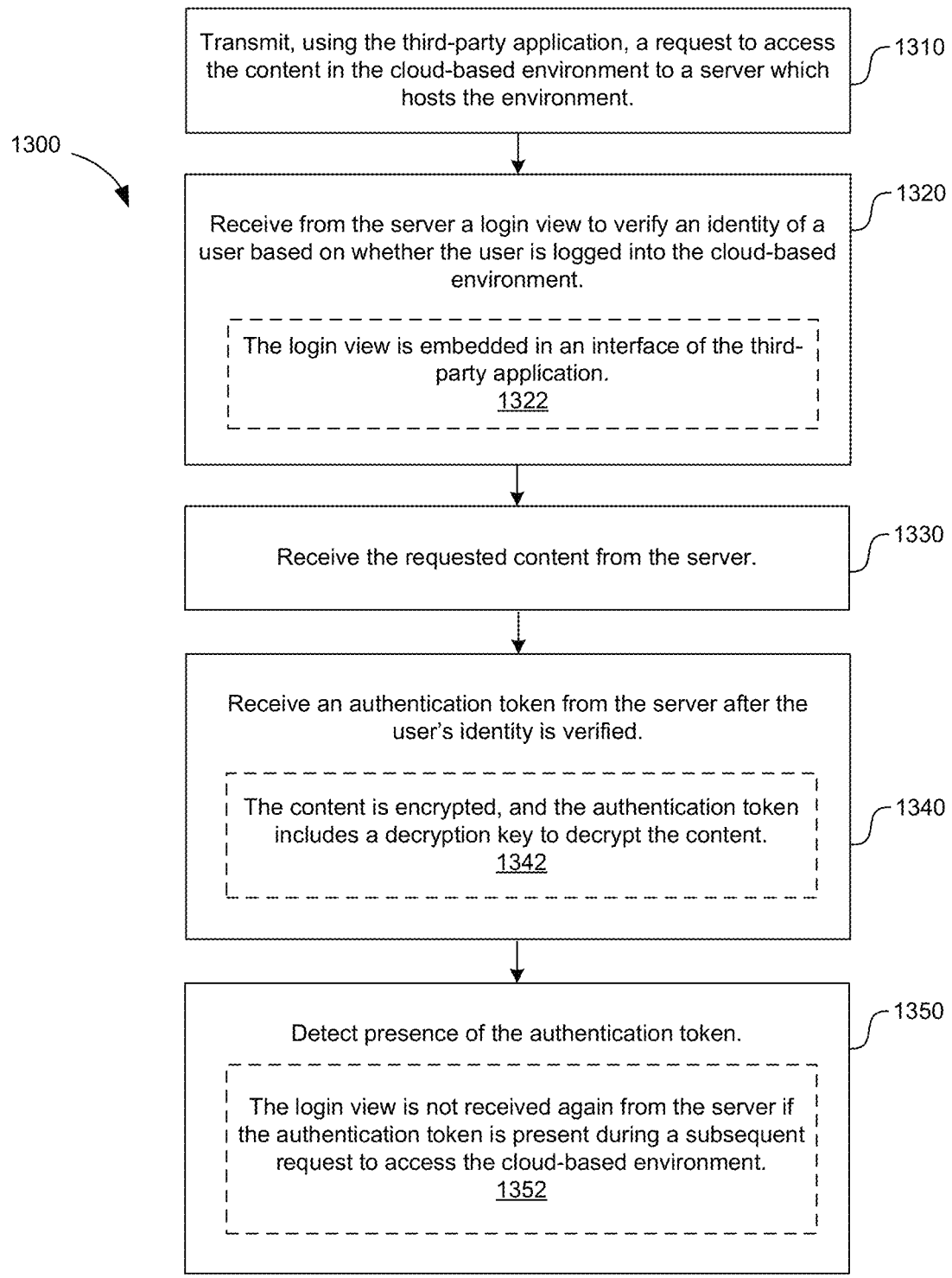
FIG. 13 depicts a flowchart illustrating an example process which can be performed by a third-party application to gain access to content in a cloud-based environment.
Figure 14:
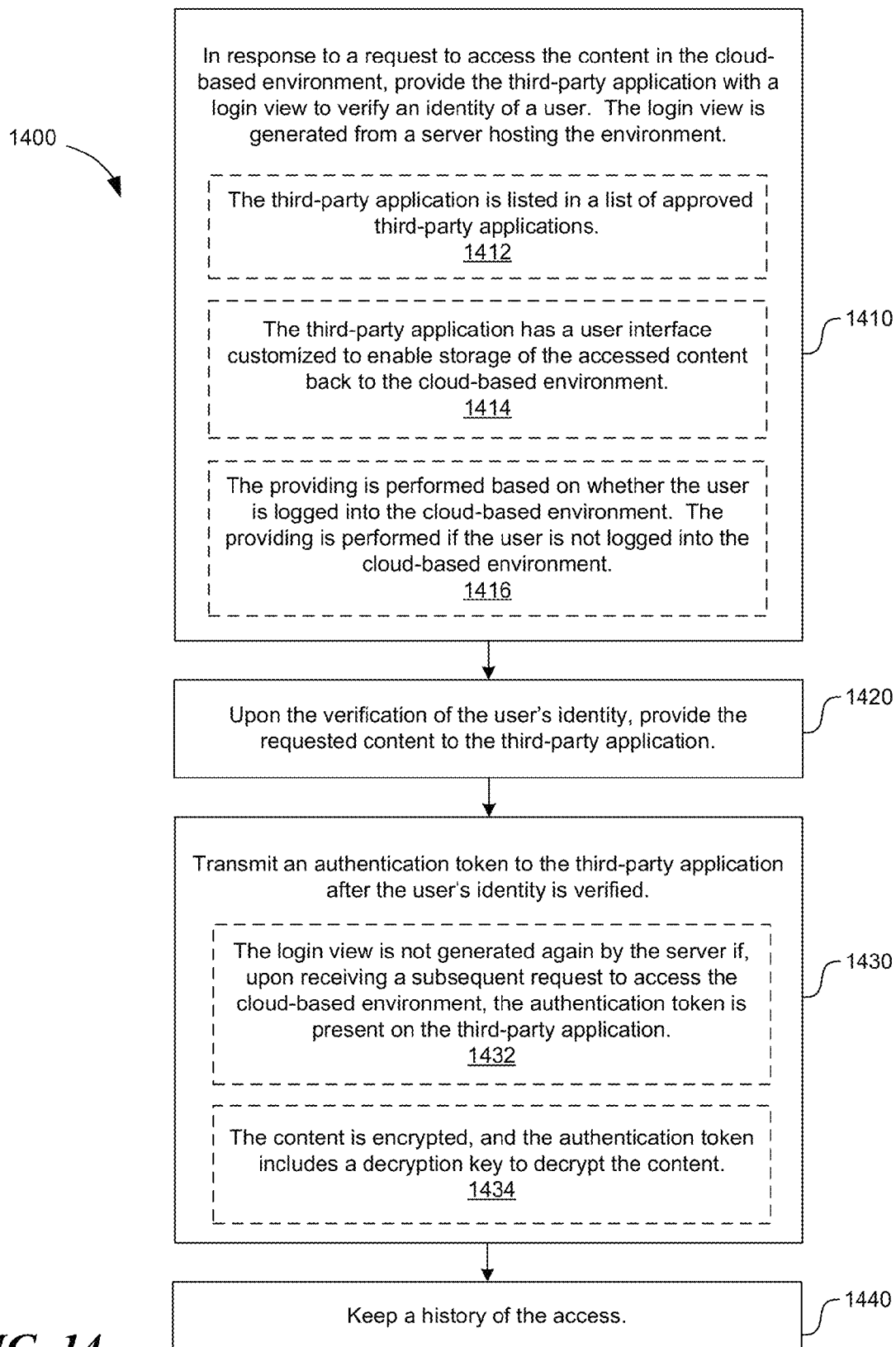
FIG. 14 depicts a flowchart illustrating an example process which can be performed by a host server for providing the third-party application of FIG. 13 with access to content in a cloud-based environment.

FIG. 13 depicts a flowchart illustrating an example process 1300 which can be performed by a third-party application to gain access to content in a cloud-based environment, and FIG. 14 depicts a flowchart illustrating an example process 1400 which can be performed by a host server for providing the third-party application of FIG. 13 with access to content in a cloud-based environment. With reference to FIGS. 1, 3, 13, and 14, the processes 1300 and 1400 are described.

First, to access content (e.g., work item 324, FIG. 3) in the cloud-based environment (e.g., workspace 302, FIG. 3), a third-party application (e.g., application 120, FIG. 1) can transmit (1310) a request to a server which hosts the workspace 302 (e.g., the host server 110, FIG. 1). In response to such request, the host server 110 can provides (1410) the third-party application 120 with a login view to verify (1410) an identity of a user. The login view is generated (1410) from the host server 110. In one embodiment, the provided login view is embedded (1322) in an interface of the third-party application 120. In some embodiments, the third-party application 120 is listed (1412) in a list of approved third-party applications. The third-party application 120 can also include (1414) a user interface customized to enable storage of the accessed content back to the cloud-based environment.

Further, in some embodiments, the login view is provided (1320, 1416) based on whether the user is logged into the cloud-based environment. According to some embodiments, the login view is provided if the user is not logged into the workspace 302. Depending on the embodiment, either the host server 110 or the third-party application 120 can make the determination as to the user's login status with respect to the cloud-based environment, and can accordingly generate/request the login view.

Then, upon the verification of the user's identity, the host server 110 provides (1420) the requested work item 342 to the third-party application 120. The third-party application 120 receives (1330) the work item 342 to perform one or more actions. In some embodiments, to further security, when the host server 110 determines that it is the third-party application 120 which sends out the request, the host server 110 only responds to such request if the third-party application 120 is listed (1412) in a list of approved third-party applications.

Additionally or alternatively, the host server 110 further transmits (1340, 1430) an authentication token to the third-party application 120 after the user's identity is verified. In some embodiments, the workspace 302 is encrypted (1342, 1434), and the authentication token includes (1342, 1434) a decryption key to decrypt the workspace 302. Some examples of such encryption/decryption algorithms include AES, DES, as well as other suitable cryptologic algorithms. Some implementation of the authentication token can automatically expire after a certain period of time, which may be predetermined, and/or may be dynamically and automatically selected. In some embodiments, the authentication token does not expire over time, and the third-party application 120 can therefore store the authentication token for future use, so that user 316 only needs to authenticate with the third-party application 120 once. The authentication tokens can be deleted, for example, when user 316 logs out, when re-authenticating a user, or when the user removing the third-party application 120 manually.

The third-party application 120 can store the authentication token in a "keychain" or other suitable, secure storage after receiving the authentication token. Then, either the host server 110 or the third-party application 120 or both can detect (1350) presence of the authentication token that is previously sent and still valid. In some embodiments, the login view is not generated again (1352, 1432) by the host server 110 if, upon receiving a subsequent request from the application 120 to access the workspace 302, the authentication token is present on the third-party application 120.

Further, the host server 110 can keep (1440) a history of the access, such as information regarding which third-party application accessed what content. The third-party application can also receive an instruction from the cloud-based environment to delete the received content (e.g., work item 324). The third-party application 120 is restricted to store the received work item 324 back to the workspace 302.

Figure 15:
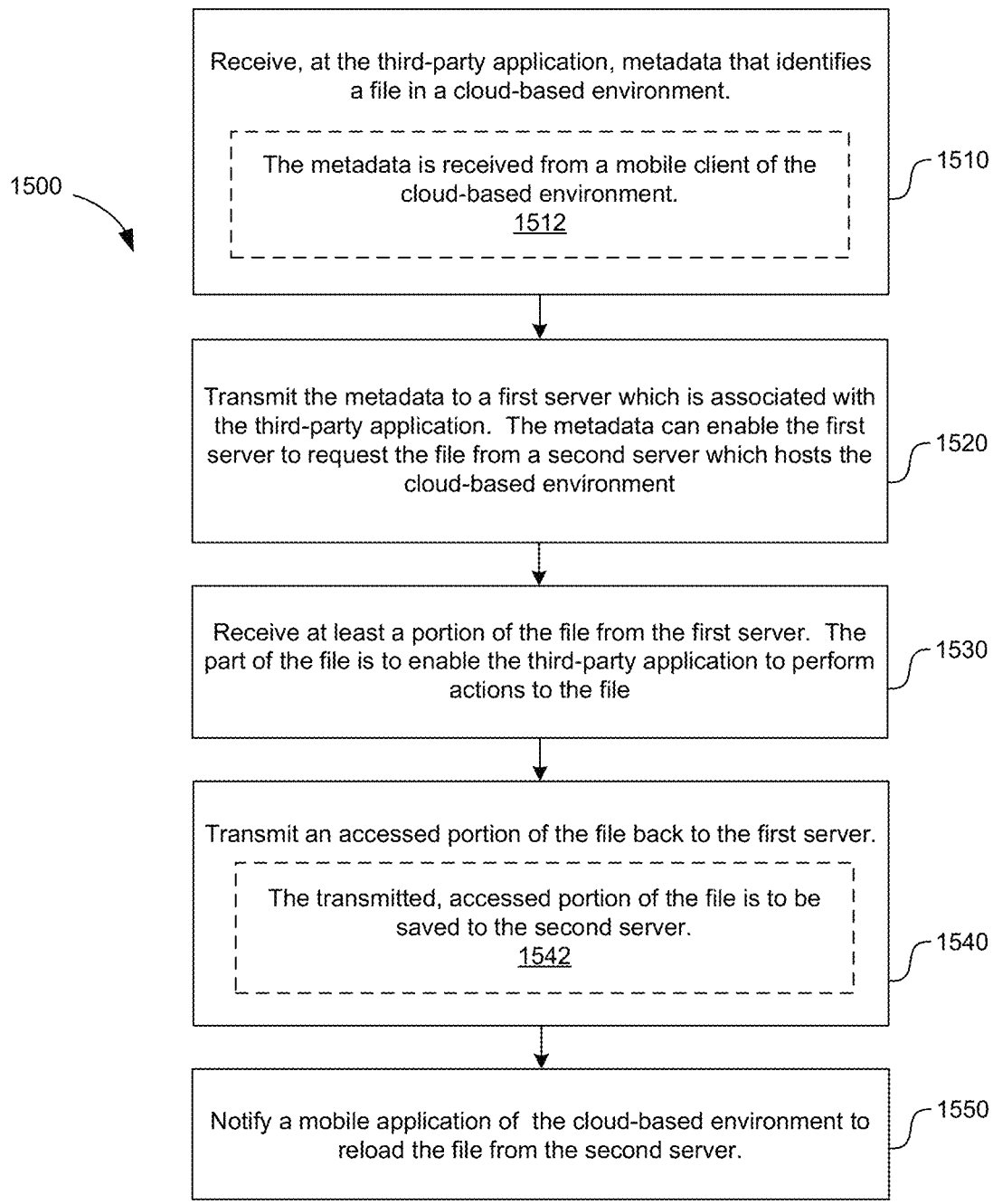
FIG. 15 depicts a flowchart illustrating an example process which can be performed by a third-party application, through a third-party application server, to gain access to content in a cloud-based environment.
Figure 16:
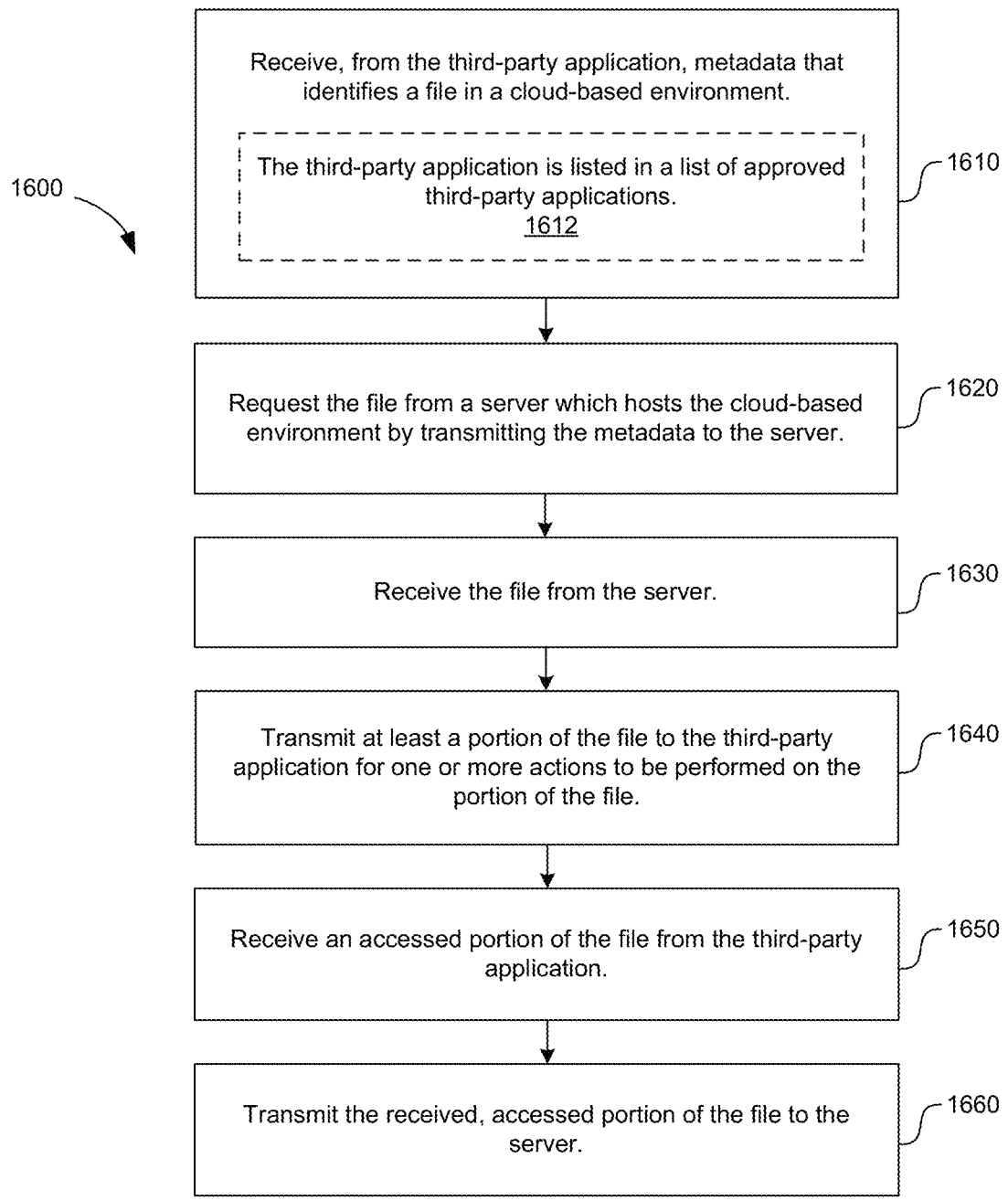
FIG. 16 depicts a flowchart illustrating an example process which can be performed by the third-party application server of FIG. 15 for providing the third-party application with access to content in a cloud-based environment.

FIG. 15 depicts a flowchart illustrating an example process 1500 which can be performed by a third-party application, through a third-party application server, to gain access to content in a cloud-based environment, and FIG. 16 depicts a flowchart illustrating an example process 1600 which can be performed by the third-party application server of FIG. 15 for providing the third-party application with access to content in a cloud-based environment. With reference to FIGS. 1, 3, 15, and 16, the processes 1500 and 1600 are described.

First, an agent application (e.g., a mobile application, or a web application) of the cloud-based platform (e.g., workspace 302, FIG. 3) can prompt a user (e.g., user 316, or collaborator 322, FIG. 3) to select a file (e.g., work item 324) to access, and select which application (e.g., third-party application 120) to use to access the work item 324.

Upon the user's selection, the mobile application sends metadata that identifies the work item 324 to the third-party application 120. After the third-party application 120 receives (1510) the metadata from the mobile application (1512), the third-party application 120 transmits (1520) the metadata to a third-party application server which is associated to the third-party application 120. The third-party application server receives (1610) the metadata, and transmits (1620) those metadata to request (1620) the work item 324 from the host server 110.

Next, the host server 110 returns the requested work item 324 as identified by the metadata to third-party application server. The third-party application server receives (1630) the requested work item 324 from the host server 110, and then communicates with and/or renders information to the third-party application 120. More specifically, the third-party application server transmits (1640) at least a portion of the file or work item 324 to the third-party application 120. After the third-party application 120 receives (1530) the at least a portion of the work item 324, one or more actions can be performed on the portion of the work item 324 by the third-party application 120. In some embodiments, the part of the work item 324 received by the third-party application 120 includes information that is capable to create a view of at least a partial content of the work item 324. In some embodiments, the part of the work item 324 received by the third-party application 120 includes data that are included the file.

After the access, the third-party application 120 transmits (1540) the work item 324 back to the third-party application server. In some alternative embodiments, the third-party application 120 transmits (1540) only an accessed portion of the work item 324 back to the third-party application server to conserve network resources. The third-party application receives (1650) the accessed portion of the work item 324 from the third-party application 120, and saves (1660, 1542) the accessed file or content back to the host server 110.

The third-party application 120 can also launch/awake/switch to the mobile application and notifies (1550) the mobile application to reload the work item 324 from the host server 110.

Figure 9A:
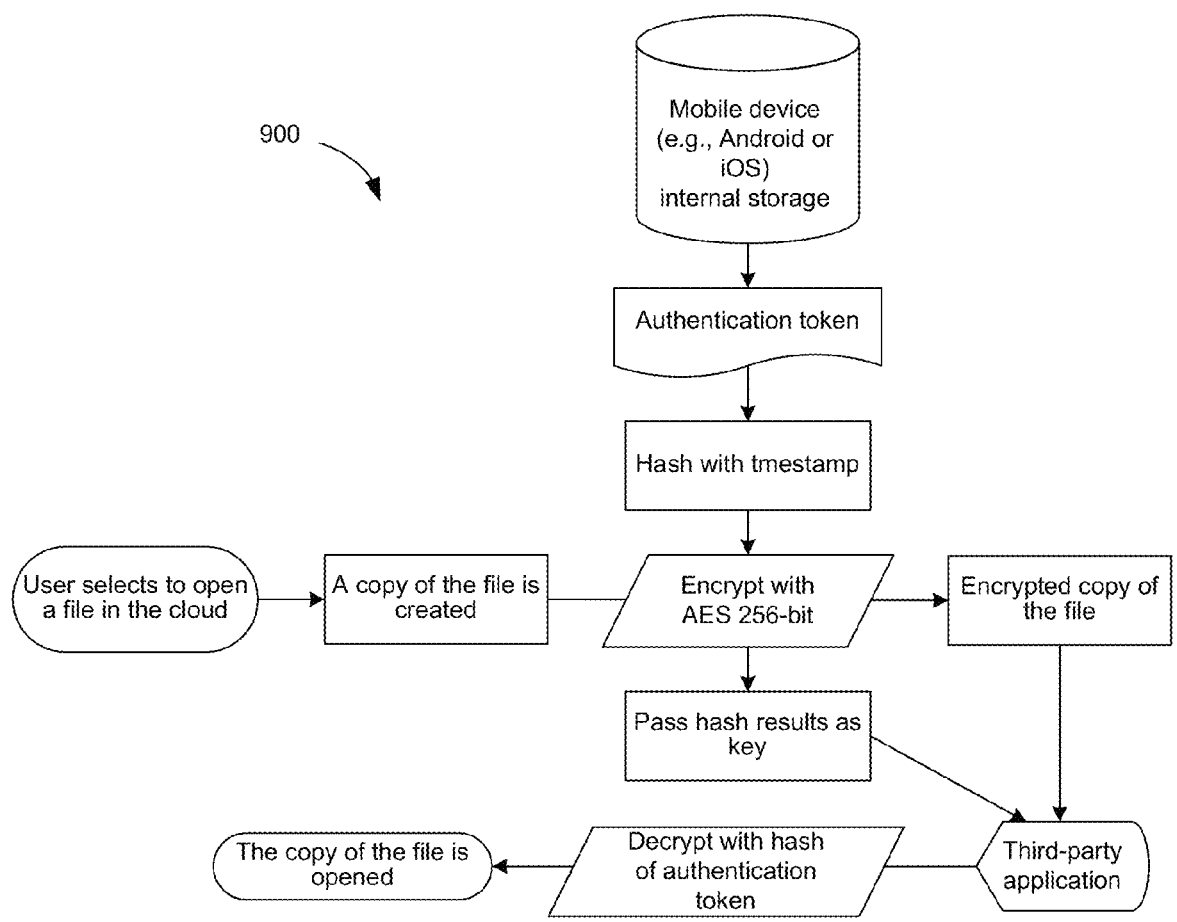
FIGS. 9A and 9B depict two flowcharts respectively illustrating two example processes which a mobile application of the cloud-based environment can perform so as to provide the file to the third-party application.
Figure 9B:
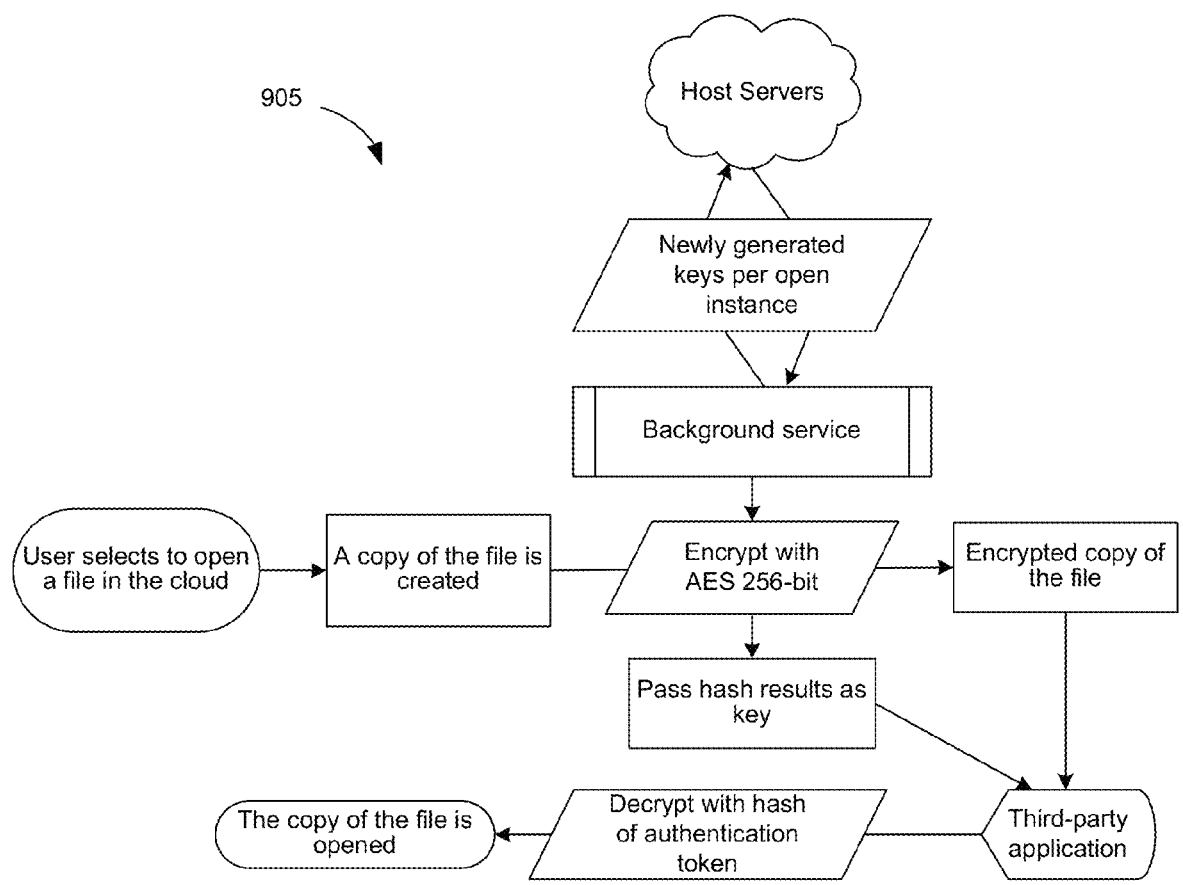

FIGS. 9A and 9B depict two flowcharts respectively illustrating two example processes 900 and 905 which a mobile application of the cloud-based environment can perform so as to provide the file to the third-party application.

Processes 900 and 905 can be employed by the mobile application of the cloud-based environment in the manners described above. More specifically, those embodiments in which the mobile application acts as an agent application in providing the third-party application 120 with access to content in the cloud-based workspace/platform/environment can adopt these processes 900 and/or 905 in enhancing security. Each of the processes 900 and 905 incorporates security enhancing measurements (e.g., AES-256 bit, as illustrated in FIGS. 9A and 9B) in a manner described above so that the content within the cloud-based environment can be accessed in a secured way.

First, with reference to FIGS. 3 and 13-14, process 900 is described. If user 316 selects to open a file in the cloud-based environment (e.g., workspace 302, FIG. 3), a copy of the file is created (e.g., by the host server 110) and sent to a mobile application that is operating on a mobile device (e.g., device 304-314 such as an Android device, an iOS device, etc.). Then, an authentication token that is previously received and stored at the mobile device 304 (e.g., via step 1340, FIG. 13) can be used by the mobile application to encrypt the received copy of the file. More specifically, a hash function may be performed on the authentication token so as to create an encryption/decryption key. In some examples, the hash function may be performed with timestamp. The copy of the file can be encrypted using, for example, AES 256-bit or other suitable algorithms along with the result of the hash function. The encrypted file, as well as the result of the hash function as a decryption key, are passed from the mobile application to the third-party application 120. Thereafter, the third-party application 120 can open/edit/otherwise access the file by using the key to decrypt the encrypted copy of the file.

In addition to or as an alternative to process 900, process 905 can be implemented in the embodiments disclosed herein. With reference to FIGS. 3 and 13-14, process 905 is described.

If user 316 selects to open a file in the cloud-based environment (e.g., workspace 302, FIG. 3), a copy of the file is created by the host server 110 and sent to a mobile application. However, instead of using a hashing function with timestamp to create an encryption/decryption key, the mobile application receives a key from the host server 110 upon each open instance, and creates an encrypted copy of the file based on the received key. Then, the encrypted copy of the file, along with the key, are sent to the third-party application 120. Thereafter, the third-party application 120 can access the file by using the key to decrypt the encrypted copy of the file.

Figure 17:
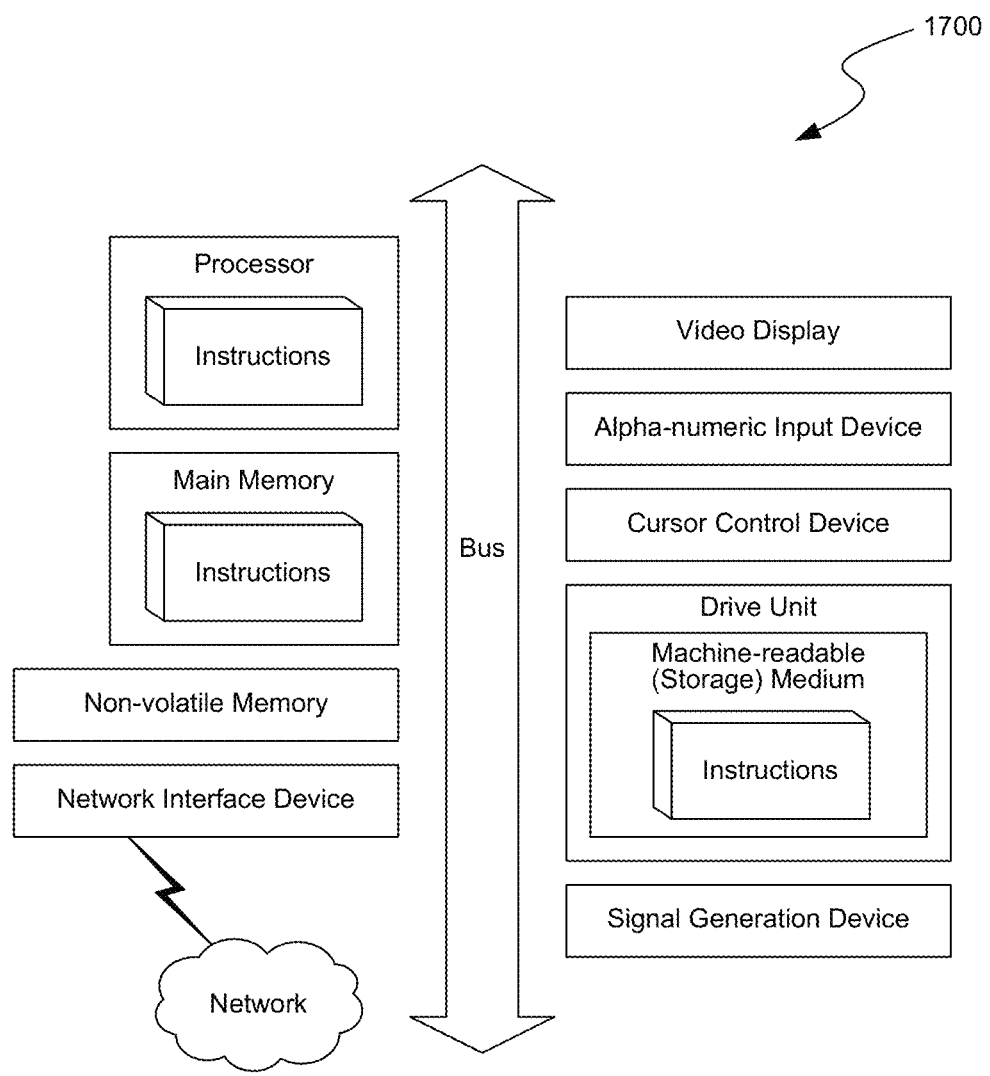
FIG. 17 depicts a diagrammatic representation of a machine in the example form of a computer system within which a set of instructions, for causing the machine to perform any one or more of the methodologies discussed herein, can be executed.

FIG. 17 shows a diagrammatic representation 1700 of a machine in the example form of a computer system within which a set of instructions, for causing the machine to perform any one or more of the methodologies discussed herein, can be executed.

In alternative embodiments, the machine operates as a standalone device or can be connected (e.g., networked) to other machines. In a networked deployment, the machine can operate in the capacity of a server or a client machine in a client-server network environment, or as a peer machine in a peer-to-peer (or distributed) network environment.

The machine can be a server computer, a client computer, a personal computer (PC), a user device, a tablet, a phablet, a laptop computer, a set-top box (STB), a personal digital assistant (PDA), a thin-client device, a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity.

The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall can additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments can perform routines having steps, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that can be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system can vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects can likewise be embodied as a means-plus-function claim, or in other forms, such as being embodied in a computer-readable medium. (Any claim intended to be treated under 35 U.S.C. §112, ¶6 begins with the words "means for".) Accordingly, the applicant reserves the right to add additional claims after filing the application to pursue such additional claim forms for other aspects of the disclosure.

What is claimed is:

1. A method for a third-party application to access to a file in a cloud-based environment, the method comprising:
   receiving, at the third-party application, metadata that identifies the file, wherein the metadata identifies the file by identifying at least one of a user, a workspace, and a security attribute associated with the file, wherein the metadata is received by the third-party application from a separate and distinct application of the cloud-based environment;
   transmitting the metadata to a server which is associated with the third-party application, wherein the metadata is utilized by the server to request the file from a host server that hosts the cloud-based environment; and
   receiving, at the third-party application, at least a portion of the file from the server to enable a user to perform one or more actions on the portion of the file.

2. The method of claim 1, wherein the metadata is received from a client of the cloud-based environment.

3. The method of claim 1, further comprising:
   transmitting an accessed portion of the file back to the host server for storage in the cloud-based environment.

4. The method of claim 1, wherein the received portion of the file comprises information for creating a view of at least a partial content of the file.

5. The method of claim 1, wherein the received portion of the file comprises data that are included in the file.

6. The method of claim 1, further comprising:
   receiving, at the third-part application, an instruction from the cloud-based environment to delete the received portion of the file.

7. The method of claim 1, wherein the security attribute restricts the third-party application from storing the received portion of the file back to the cloud-based environment.

8. The method of claim 1, wherein the third-party application and the server associated with the third-party application are associated with a single entity.

9. The method of claim 1, wherein the user associated with the file includes an owner or a collaborator of the file and wherein the security attribute associated with the file determines whether the portion of the file is storable by the third-party application.

10. A method for providing a third-party application with access to a file in a cloud-based environment, the method comprising:
    receiving, from the third-party application, metadata that identifies the file, wherein the metadata identifies the file by identifying at least one of a user, a workspace, and a security attribute associated with the file, wherein the metadata is received by the third-party application from a separate and distinct application of the cloud-based environment, and wherein the separate and distinct application is a mobile application operating on a mobile device;
    requesting the file from a host server which hosts the cloud-based environment by transmitting the metadata to the host server, wherein the server associated with the third-party application utilizes the metadata to request the file from the host server;
    receiving the file from the host server in response to the request; and
    transmitting at least a portion of the file to the third-party application for one or more actions to be performed on the portion of the file.

11. The method of claim 10, further comprising:
    receiving an accessed portion of the file from the third-party application.

12. The method of claim 11, further comprising:
    transmitting the received, accessed portion of the file to the host server.

13. The method of claim 10, wherein the third-party application is listed in a list of approved third-party applications.

14. The method of claim 10, wherein the user associated with the file includes an owner or a collaborator of the file and wherein the security attribute associated with the file determines whether the portion of the file is storable by the third-party application.

15. A non-transitory machine-readable storage medium having stored thereon instructions which, when executed by a processor, cause the processor to:
    receive, at the third-party application, metadata that identifies the file, wherein the metadata identifies the file by identifying at least one of a user, a workspace, and a security attribute associated with the file, wherein the metadata is received by the third-party application from a separate and distinct application of a cloud-based environment;
    transmit the metadata to a server which is associated with the third-party application, wherein the metadata is utilized by the server to request the file from a host server that hosts the cloud-based environment; and receive, at the third-party application, at least a portion of the file from the server to enable a user to perform one or more actions on the portion of the file.

16. The machine-readable storage medium of claim 15, wherein the metadata is received from a client of the cloud-based environment.

17. The machine-readable storage medium of claim 15, wherein the instructions further cause the processor to:
transmit an accessed portion of the file back to the host server to save the transmitted, accessed portion of file to the cloud-based environment.

18. The machine-readable storage medium of claim 15, wherein the user associated with the file includes an owner or a collaborator of the file and wherein the security attribute associated with the file determines whether the portion of the file is storable by the third-party application.

19. A non-transitory machine-readable storage medium having stored thereon instructions which, when executed by a processor, cause the processor to:
receive, from the third-party application, metadata that identifies the file, wherein the metadata identifies the file by identifying at least one of a user, a workspace, and a security attribute associated with the file, wherein the metadata is received by the third-party application from a separate and distinct application of a cloud-based environment, and wherein the separate and distinct application is a mobile application operating on a mobile device;
request the file from a host server which hosts the cloud-based environment by transmitting the metadata to the host server associated with the third-party application, wherein the server associated with the third-party application utilizes the metadata to request the file from the host server;
receive the file from the host server in response to the request; and
transmit at least a portion of the file to the third-party application for one or more actions to be performed on the portion of the file.

20. The machine-readable storage medium of claim 19, wherein the instructions further cause the processor to:
receive an accessed portion of the file from the third-party application.

21. The machine-readable storage medium of claim 20, wherein the instructions further cause the processor to:
transmit the received, accessed portion of the file to the host server.

22. The machine-readable storage medium of claim 19, wherein the user associated with the file includes an owner or a collaborator of the file and wherein the security attribute associated with the file determines whether the portion of the file is storable by the third-party application.

23. A method for a third-party application on a client device to access content in a cloud-based environment, the method comprising:
receiving, by a client application of the cloud-based environment, the content from an associated workspace in the cloud-based environment;
receiving, by the client application, an authentication token used to decrypt the associated workspace;
creating, by the client application, a key by hashing the authentication token with a timestamp;
encrypting, by the client application, the content using the key; and
providing, by the client application, the encrypted content, along with the hashed authentication token, to the third-party application on the client device to enable the third-party application to decrypt the encrypted content.

24. A non-transitory machine-readable storage medium having stored thereon instructions which, when executed by a processor, cause the processor to:
at a client application of a cloud-based environment,
receive a file from an associated workspace of the cloud-based environment;
create a key based on hashing an authentication token used to decrypt the associated workspace and a timestamp;
encrypt the file using the key; and
provide the encrypted content, along with the hashed authentication token, to a third-party application.

25. The machine-readable storage medium of claim 24, wherein the authentication token is retrieved from a local storage.

26. A method of providing a third-party application access to a file in a cloud-based environment, comprising:
receiving, at a host server hosting the cloud-based environment, a request for a file, the request including metadata that identifies the file at the cloud-based environment;
wherein the request is received from a third-party application server associated with a third-party application that utilizes the metadata to make the request, wherein the third-party application receives the metadata from a separate and distinct application of the cloud-based environment; and
wherein the metadata identifies at least one of a user, a workspace, and a security attribute associated with the file;
identifying the file requested by the third-party application server based on the metadata included in the request; and
transmitting the file to the third-party application server to enable the file to be accessed or edited using the third-party application.

27. The method of claim 26, wherein the user associated with the file includes an owner or a collaborator of the file and wherein the security attribute associated with the file determines whether the portion of the file is storable by the third-party application.

28. The method of claim 26, further comprising:
notifying a client of the cloud-based environment to reload the file from the cloud-based environment.

29. The method of claim 26, further comprising:
at the host server, keeping a history of the file access, the history including at least information regarding which third-party application accessed what file.

30. A non-transitory machine-readable storage medium having stored thereon instructions which, when executed by a processor, cause the processor to:
receive a request for a file from a third-party application server associated with a third-party application, the request including metadata that is utilized by the third-party application server to request the file from the cloud-based environment;
wherein the metadata identifies at least one of a user, a workspace, and a security attribute associated with the file, wherein the third-party application receives the metadata from a separate and distinct application of the cloud-based environment;
identify the file requested by the third-party application server based on the metadata included in the request; and
transmit the file to the third-party application server to enable the file to be accessed or edited using the third-party application.

31. The machine-readable storage medium of claim 30, wherein the user associated with the file includes an owner or a collaborator of the file and wherein the security attribute associated with the file determines whether the portion of the file is storable by the third-party application.

* * * * *